United States Patent
Wang et al.

(10) Patent No.: US 12,437,410 B2
(45) Date of Patent: Oct. 7, 2025

(54) ARTIFICIAL INTELLIGENCE-BASED PATHOLOGICAL IMAGE PROCESSING METHOD AND APPARATUS, ELECTRONIC DEVICE, AND STORAGE MEDIUM

(71) Applicant: Tencent Technology (Shenzhen) Company Limited, Shenzhen (CN)

(72) Inventors: Liang Wang, Shenzhen (CN); Kaiwen Xiao, Shenzhen (CN); Kuan Tian, Shenzhen (CN); Jianhua Yao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 481 days.

(21) Appl. No.: 17/903,851

(22) Filed: Sep. 6, 2022

(65) Prior Publication Data

US 2023/0005156 A1    Jan. 5, 2023

Related U.S. Application Data

(63) Continuation of application No. PCT/CN2021/100910, filed on Jun. 18, 2021.

(30) Foreign Application Priority Data

Aug. 6, 2020    (CN) .......................... 202010784956.0

(51) Int. Cl.
*G06N 3/0455*    (2023.01)
*G06T 7/00*    (2017.01)
(Continued)

(52) U.S. Cl.
CPC .............. *G06T 7/11* (2017.01); *G06T 7/0012* (2013.01); *G06T 2207/20076* (2013.01);
(Continued)

(58) Field of Classification Search
None
See application file for complete search history.

(56) References Cited

U.S. PATENT DOCUMENTS

| 8,401,285 B1 | 3/2013 | Rezaee et al. |
| 2015/0133321 A1* | 5/2015 | Bhaumik ......... G01N 33/56977 506/9 |

(Continued)

FOREIGN PATENT DOCUMENTS

| CN | 101710420 A | 5/2010 |
| CN | 107665491 A | 2/2018 |

(Continued)

OTHER PUBLICATIONS

Saylor J, Ma Z, Goodridge HS, Huang F, Cress AE, Pandol SJ, Shiao SL, Vidal AC, Wu L, Nickols NG, Gertych A, Knudsen BS. Spatial Mapping of Myeloid Cells and Macrophages by Multiplexed Tissue Staining. Front Immunol. Dec. 14, 2018;9:2925. doi: 10.3389/fimmu.2018.02925. PMID: 30619287; PMCID: PMC6302234. (Year: 2018).*

(Continued)

*Primary Examiner* — Beniyam Menberu
(74) *Attorney, Agent, or Firm* — Morgan, Lewis & Bockius LLP

(57) ABSTRACT

This application provides an artificial intelligence-based pathological image processing method performed by an electronic device. The method includes: determining a seed pixel of an immune cell region from a pathological image; obtaining a seed pixel mask image corresponding to the seed pixel of the immune cell region from the pathological image based on the seed pixel of the immune cell region; segmenting an epithelial cell region in the pathological image, to obtain an epithelial cell mask image of the pathological image; fusing the seed pixel mask image and the epithelial cell mask image of the pathological image, to obtain an (Continued)

effective seed pixel mask image corresponding to the immune cell region in the pathological image; and determining a ratio value of the immune cell region in the pathological image based on the effective seed pixel mask image.

20 Claims, 16 Drawing Sheets

(51) Int. Cl.
    *G06T 7/11*     (2017.01)
    *G06V 10/26*     (2022.01)
    *G06V 10/80*     (2022.01)

(52) U.S. Cl.
    CPC .............. *G06T 2207/20081* (2013.01); *G06T 2207/20084* (2013.01); *G06T 2207/30024* (2013.01)

(56) References Cited

U.S. PATENT DOCUMENTS

| | | | |
|---|---|---|---|
| 2018/0089803 A1 | 3/2018 | Zhang et al. | |
| 2022/0036971 A1* | 2/2022 | Yoo | G16H 30/40 |

FOREIGN PATENT DOCUMENTS

| | | | | |
|---|---|---|---|---|
| CN | 109300530 A | 2/2019 | | |
| CN | 109544566 A | 3/2019 | | |
| CN | 110060245 A | 7/2019 | | |
| CN | 110120040 A | 8/2019 | | |
| CN | 110400318 A | 11/2019 | | |
| CN | 111899252 | * 11/2020 | ........... G06N 3/0455 | |
| CN | 111899252 A | 11/2020 | | |
| WO | WO 2016/034655 A2 | 3/2016 | | |

OTHER PUBLICATIONS

Biran A, Zada L, Abou Karam P, Vadai E, Roitman L, Ovadya Y, Porat Z, Krizhanovsky V. Quantitative identification of senescent cells in aging and disease. Aging Cell. Aug. 2017; 16(4):661-671. doi: 10.1111/acel.12592. Epub Apr. 28, 2017. PMID: 28455874; PMCID: PMC5506427. (Year: 2017).*

Tencent Technology (Shenzhen) Company Limited, European Search Report, EP21852878.4, Aug. 14, 2023, 9 pgs.

Mabrouk et al., "Immune System Programming for Medical Image Segmentation", Journal of Computational Science, vol. 31, Feb. 28, 2019, https://doi.org.10.1016/j.jocs.2019.01.002.

Cunyue et al., "A New Algorithm of Positive Cells Contour Detection in Histopathology Image", Advanced Engineering Sciences, Dec. 2012, https://jsuese.scu.edu.cn/jsuese_cn/ch/reader/view_abstract.aspx?file_no=201101124.

Tencent Technology, WO, PCT/CN2021/100910, Sep. 18, 2021, 5 pgs.

Tencent Technology, IPRP, PCT/CN2021/100910, Feb. 7, 2023, 6 pgs.

Tencent Technology, ISR, PCT/CN2021/100910, Sep. 18, 2021, 3 pgs.

* cited by examiner

ARTIFICIAL INTELLIGENCE-BASED PATHOLOGICAL IMAGE PROCESSING METHOD AND APPARATUS, ELECTRONIC DEVICE, AND STORAGE MEDIUM

CROSS-REFERENCE TO RELATED APPLICATIONS

This application is a continuation application of PCT Patent Application No. PCT/CN2021/100910, entitled "ARTIFICIAL INTELLIGENCE-BASED PATHOLOGICAL IMAGE PROCESSING METHOD AND APPARATUS, ELECTRONIC DEVICE, AND STORAGE MEDIUM" filed on Jun. 18, 2021, which claims priority to Chinese Patent Application No. 202010784956.0, filed with the State Intellectual Property Office of the People's Republic of China on Aug. 6, 2020, and entitled "PATHOLOGICAL IMAGE PROCESSING METHOD AND DEVICE BASED ON ARTIFICIAL INTELLIGENCE", all of which are incorporated herein by reference in their entirety.

FIELD OF THE TECHNOLOGY

This application relates to the field of artificial intelligence technologies, and in particular, to an artificial intelligence-based pathological image processing method and apparatus, an electronic device, and a computer-readable storage medium.

BACKGROUND OF THE DISCLOSURE

Artificial intelligence (AI) is a comprehensive technology of computer science and deals with the design principles and implementation methods of various intelligent machines, so that the machines are capable of perceiving, reasoning, and decision-making. An AI technology is a comprehensive discipline, covering a wide range of fields including several major directions such as natural language processing and machine learning/deep learning. With the development of technologies, the AI technology will be applied in more fields and play an increasingly important role.

In the related art, an effective solution of determining a ratio value (or referred to as an IC value or an immune cell score) of immune cells in a pathological image based on artificial intelligence mainly relies on manual determining on the pathological image.

SUMMARY

Embodiments of this application provide an artificial intelligence-based pathological image processing method and apparatus, an electronic device, and a computer-readable storage medium, which can quantify a ratio value of an immune cell in a pathological image, to improve accuracy of the ratio value of the immune cell in the pathological image.

Technical solutions in the embodiments of this application are implemented as follows:

An embodiment of this application provides an artificial intelligence-based pathological image processing method performed by an electronic device, the method including:

determining a seed pixel corresponding to an immune cell region from a pathological image;

obtaining a seed pixel mask image corresponding to the seed pixel of the immune cell region from the pathological image based on the seed pixel of the immune cell region;

segmenting an epithelial cell region in the pathological image, to obtain an epithelial cell mask image of the pathological image;

fusing the seed pixel mask image and the epithelial cell mask image of the pathological image, to obtain an effective seed pixel mask image corresponding to the immune cell region in the pathological image; and determining a ratio value of the immune cell region in the pathological image based on the effective seed pixel mask image.

An embodiment of this application provides an artificial intelligence-based pathological image processing apparatus, including:

a processing module, configured to determine a seed pixel corresponding to an immune cell region from a pathological image; and obtain a seed pixel mask image corresponding to the seed pixel of the immune cell region from the pathological image based on the seed pixel of the immune cell region;

a segmentation module, configured to segment an epithelial cell region in the pathological image, to obtain an epithelial cell mask image of the pathological image;

a fusion module, configured to fuse the seed pixel mask image and the epithelial cell mask image of the pathological image, to obtain an effective seed pixel mask image corresponding to the immune cell region in the pathological image; and a determining module, configured to determine a ratio value of the immune cell region in the pathological image based on the effective seed pixel mask image.

An embodiment of this application provides an electronic device for processing a pathological image. The electronic device includes:

a memory, configured to store executable instructions; and a processor, configured to implement the artificial intelligence-based pathological image processing method provided in the embodiments of this application when executing the executable instructions stored in the memory.

An embodiment of this application provides a non-transitory computer-readable storage medium, storing executable instructions, the executable instructions, when executed by a processor of an electronic device, being used by the electronic device for implementing the artificial intelligence-based pathological image processing method provided in the embodiments of this application.

The embodiments of this application have the following beneficial effects:

The effective seed pixel mask image is obtained by combining the seed pixel mask image and the epithelial cell mask image, and the ratio value of the immune cell region in the pathological image is determined according to the effective seed pixel in the effective seed pixel mask image, to accurately recognize the ratio value of the immune cell region in the pathological image.

DESCRIPTION OF EMBODIMENTS

Figure 1A:
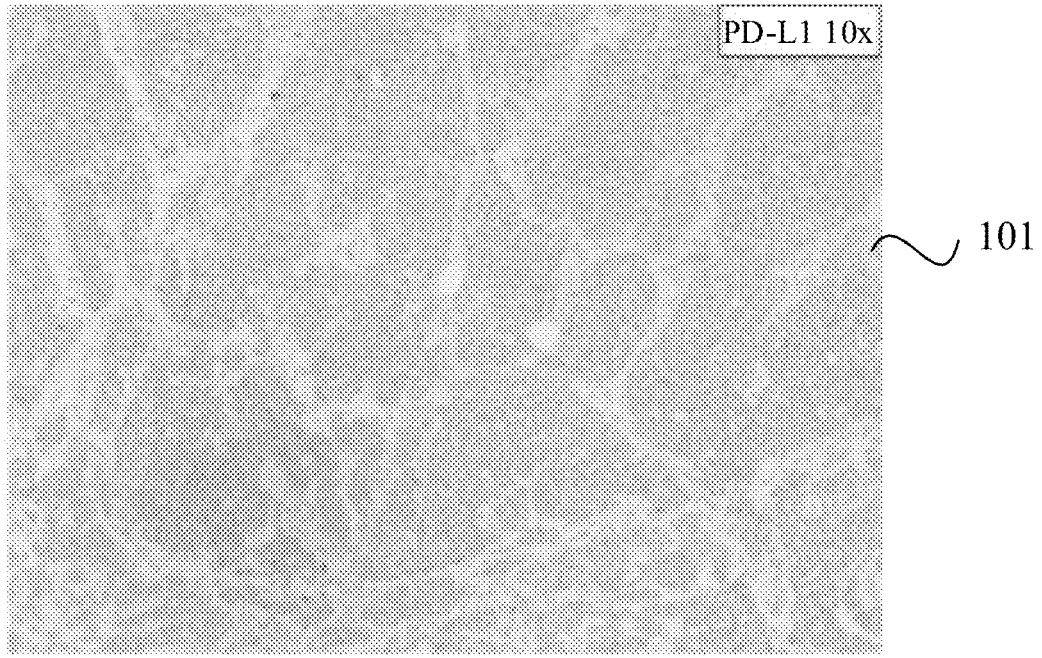
FIG. 1A and FIG. 1B are pathological images according to a related art.

To make the objectives, technical solutions, and advantages of this application clearer, the following describes this application in further detail with reference to the accompanying drawings. The described embodiments are not to be considered as a limitation to this application. All other embodiments obtained by a person of ordinary skill in the art without creative efforts shall fall within the protection scope of this application.

In the following descriptions, the included term "first/second" is merely intended to distinguish similar objects but does not necessarily indicate a specific order of an object. It may be understood that "first/second" is interchangeable in terms of a specific order or sequence if permitted, so that the embodiments of this application described herein can be implemented in a sequence in addition to the sequence shown or described herein.

Unless otherwise defined, meanings of all technical and scientific terms used in this specification are the same as those usually understood by a person skilled in the art to which this application belongs. Terms used in this specification are merely intended to describe objectives of the embodiments of this application, but are not intended to limit this application.

Before the embodiments of this application are further described in detail, a description is made on terms in the embodiments of this application, and the terms in the embodiments of this application are applicable to the following explanations.

(1) A convolutional neural network (CNN), as one of representative algorithms of deep learning, is a feedforward neural network (FNN) that contains convolution calculation and has a deep structure. The convolutional neural network has a representation learning capability and can perform shift-invariant classification on an input image according to a hierarchical structure thereof.

(2) A programmed death 1 (PD-1), also referred to as a cluster of differentiation 279 (CD279), is a receptor protein on a surface of a T cell in an immune cell, that is, an important immunosuppressive molecule. An immune system is adjusted and tolerance of the immune system is improved by downward adjusting a reaction of the immune system to human cells and suppressing an inflammatory activity of the T cell. The PD-1 may prevents autoimmune diseases, but may also prevent the immune system from killing cancer cells.

(3) A programmed cell death-ligand 1 (PD-L1) is a ligand for the PD-1 and is a first-type transmembrane protein with a size being 40 kDa. Normally, the immune system responds to foreign antigens that accumulate in the lymph nodes or spleen, promoting the proliferation of antigen-specific T cells. However, the combination of PD-1 and PD-L1 may conduct an inhibitory signal to reduce the proliferation of the T cells.

(4) An immune cell value (an IC value, or referred to as an immune cell score), also referred to as an IC proportion value or an IC ratio value, is a percentage value of immune cells occupying a tumor region.

(5) A patch image is an image of a region of interest (ROI) obtained from a whole slide imaging (WSI) image.

(6) A pathological image is an image used for presenting a pathological morphology of organs, tissues, or cells of a body. A cause, pathogenesis and development of a disease may be explored based on the pathological image. The pathological image includes a lesion slice image (an image formed by cutting a lesion tissue with a specific size for observing a lesion change), an endoscopic image, and the like.

Figure 1B:
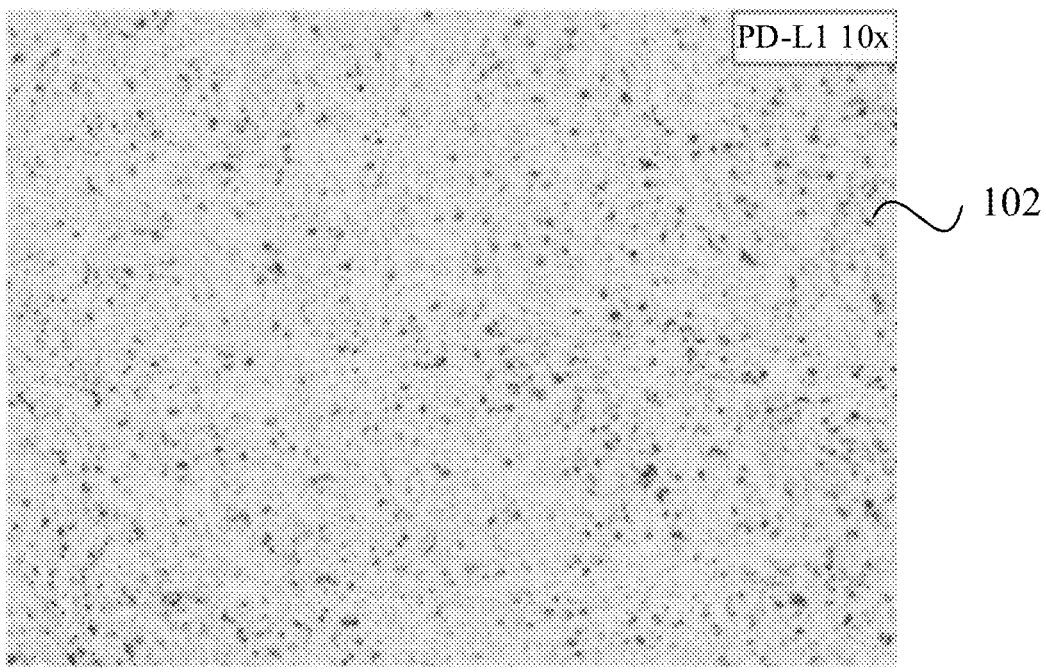

In the related technology, evaluation of the immune efficacy of the PD-1/PD-L1 by using an immunohistochemical method has become a research focus and hotspot. The PD-L1 is related to tumor progression and poor prognosis, and the PD-L1 is considered to be an effective biomarker for predicting prognosis. For example, breast cancer is the most common malignant tumor in women, and precision medicine provides an opportunity for more refined and individualized treatment of the breast cancer. A humanized monoclonal antibody (atezolizumab) combined with a paclitaxel protein binding agent may be used for the treatment of unresectable locally advanced triple-negative breast cancer (TNBC) or metastatic TNBC, which is diagnosed with the PD-L1 (SP142). In the breast cancer treatment, a quantity of immune cells (an expression of the PD-L1) in a patient may be obtained by using the PD-L1 method, to assist the patient or a doctor in assessing the ability to resist cancer, that is, the doctor will estimate a proportion value of stained immune cells (IC) in a tumor region, and the proportion value is used for selecting a medication method for cancer treatment. Roche provides a method for interpreting an IC value (also referred to as an IC ratio value or an IC value) based on an SP142 stain. The Roche defines some image patterns with IC values being less than 1% and image patterns with IC values being greater than 1%. A patch example image (a lesion slice image) with an IC value being less than 1% is shown in FIG. 1A, and points 101 represent immune cells. In FIG. 1A, the immune cells are sparse, indicating that a proportion of the immune cells is relatively small. A patch example image with an IC value being greater than 1% is shown in FIG. 1B, and points 102 represent immune cells. In FIG. 1B, the immune cells are dense, indicating that a proportion of the immune cells is relatively large.

However, the related art has the following problems: (1) An interpretation result is an overall result for the patch example image rather than a pixel-based result and has relatively low interpretation accuracy. (2) There are only two interpretation results, that is, greater than or equal to 1% or less than 1%, and a more precise specific IC value cannot be given. For example, a specific IC value is not given for a patch image greater than or equal to 1%.

To resolve the problems, the embodiments of this application provide an artificial intelligence-based pathological image processing method and apparatus, an electronic device, and a non-transitory computer-readable storage medium, which can quantify a ratio value of an immune cell in a pathological image, to improve accuracy of the ratio value of the immune cell in the pathological image.

The artificial intelligence-based pathological image processing method provided in the embodiments of this application may be implemented by a terminal/a server alone; or may be implemented by collaborating a terminal and a server. For example, the terminal independently performs the artificial intelligence-based pathological image processing method, or the terminal sends a pathological image to the server, and the server performs the artificial intelligence-based pathological image processing method according to the received pathological image.

The electronic device for processing a pathological image provided in the embodiments of this application may be terminal devices or servers of various types. The server may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. The terminal may be a smartphone, a tablet computer, a notebook computer, a desktop computer, a smart speaker, a smart watch, or the like, but is not limited thereto. The terminal and the server may be directly or indirectly connected in a wired or wireless communication manner. This is not limited in this application.

For example, the server may be a server cluster deployed on a cloud and opens an artificial intelligence cloud service (or referred to as an AI as a service (AIaaS)) to a user. An AIaaS platform may split several common AI services and provide independent or packaged services in the cloud. This service mode is similar to an AI theme store: all users may access one or more AI services provided by using the AIaaS platform through an API interface.

For example, one AI service may be a pathological image processing service, that is, a pathological image processing program provided in this embodiment of this application is encapsulated in the cloud server. A user invokes the pathological image processing service in the cloud service by using the terminal (in which a client such as a medical research client or a health medical client runs), so that the server deployed on the cloud invokes the encapsulated pathological image processing program to fuse a seed pixel mask image and an epithelial cell mask image of a pathological image, to obtain an effective seed pixel mask image corresponding to an immune cell region in the pathological image, determine a ratio value of the immune cell region in the pathological image based on the effective seed pixel mask image to respond to a prediction request for the pathological image. For example, for a medical research application, an acquired pathological image is processed, to obtain a ratio value (an IC value) of an immune cell region in the pathological image, and the pathological image and the corresponding IC value are returned to the medical research client for doctors and research fellows to perform tumor treatment research based on the IC value. For a health medical application, an acquired pathological image is processed, to obtain a ratio value (an IC value) of an immune cell region in the pathological image, and required calculation continues to be performed by using the IC value as intermediate data, to assist the doctors, the research fellows, and patients in disease prediction and re-diagnosis.

Figure 2:
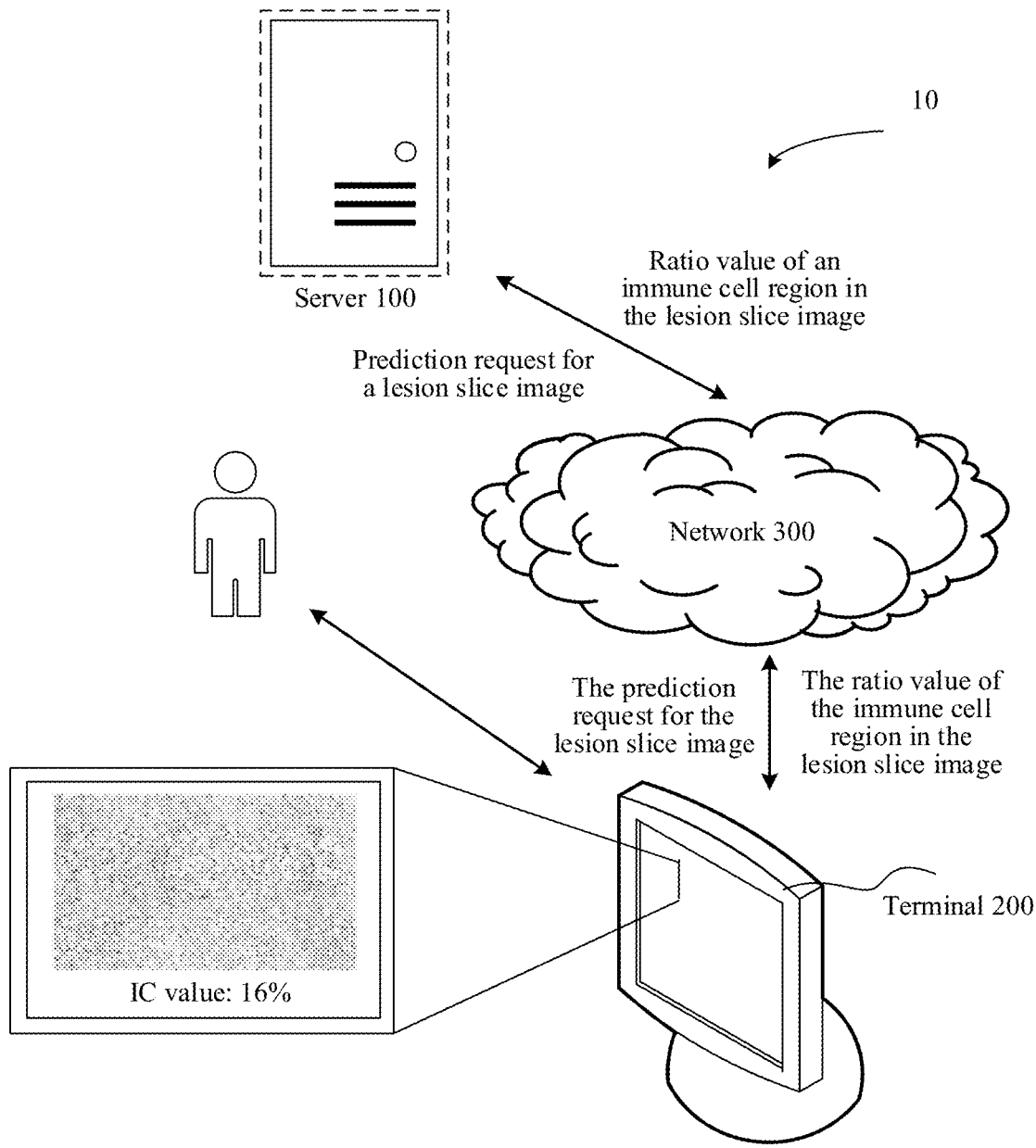
FIG. 2 is a schematic diagram of an application scenario of a pathological image processing system 10 according to an embodiment of this application.

FIG. 2 is a schematic diagram of an application scenario of a pathological image processing system 10 according to an embodiment of this application. A terminal 200 is connected to a server 100 through a network 300. The network 300 may be a wide area network or a local area network, or a combination of the two.

The terminal 200 (in which a client such as a medical research client or a health medical client runs) may be configured to obtain a pathological image. For example, an image acquisition apparatus of the terminal 200 is configured to acquire the pathological image.

In some embodiments, a pathological image processing plug-in may be implanted in the client running in the terminal and configured to implement the artificial intelligence-based pathological image processing method locally on the client. For example, after obtaining a prediction request for a pathological image (which also obtains the pathological image), the terminal 200 invokes the pathological image processing plug-in, to implement the artificial intelligence-based pathological image processing method. That is, a seed pixel mask image and an epithelial cell mask image of the pathological image are fused, to obtain an effective seed pixel mask image corresponding to an immune cell region in the pathological image, and a ratio value of the immune cell region in the pathological image is determined based on the effective seed pixel mask image to respond to the prediction request for the pathological image. For example, for a medical research application, an acquired pathological image is processed, to obtain a ratio value (an IC value) of an immune cell region in the pathological image, and the pathological image and the corresponding IC value are returned to the medical research client for research fellows to perform manual review on the pathological image with reference to the pathological image and the corresponding IC value to check whether the IC value is accurate. When it is determined that the IC value is not accurate, the IC value is corrected, and the pathological image and the corresponding corrected IC value are stored in a database, to expand the database for subsequent medical research based on abundant and accurate medical data in the database.

In some embodiments, after obtaining a prediction request for a pathological image, the terminal 200 invokes a pathological image processing interface (which may be implemented in a form of a cloud service, that is, an image processing service) of the server 100. The server 100 fuses a seed pixel mask image and an epithelial cell mask image of the pathological image, to obtain an effective seed pixel mask image corresponding to an immune cell region in the pathological image, and determines a ratio value of the immune cell region to the pathological image based on the effective seed pixel mask image to respond to the prediction request for the pathological image. For example, for a medical research application, after a research fellow inputs a pathological image into the medical research application, the medical research application automatically obtains a prediction request for the pathological image (which also obtains the pathological image), invokes the pathological image processing interface of the server 100 to process the pathological image, to obtain a ratio value (an IC value) of an immune cell region in the pathological image, queries another pathological image (a slice reference image) having an IC value the same as the IC value in a database based on the IC value, and returns the pathological image, the corresponding IC value, and the slice reference image to the medical research client. The research fellow performs manual review on the pathological image with reference to the slice reference image to check whether the IC value is accurate. When it is determined that the IC value is not accurate, the IC value is corrected, and the pathological image and the corresponding corrected IC value are stored in the database, to expand the database for subsequent medical research based on abundant and accurate medical data in the database.

In some embodiments, the terminal or server may implement, by running a computer program, the artificial intelligence-based pathological image processing method provided in this embodiment of this application. For example, the computer program may be a native program or a software module in an operating system. The computer program may be a native application (APP), that is, a program that needs to be installed in the operating system before the program can run. Alternatively, the computer program may be an applet, that is, a program that can be run by just being downloaded into a browser environment; Alternatively, the computer program may be an applet that can be embedded in any APP. To sum up, the computer program may be any form of application, module or plug-in.

In some embodiments, a plurality of servers may form a blockchain, and the server 100 is a node in the blockchain. There may be information connections among nodes in the blockchain, and the nodes may transmit information through the information connections. Data (for example a pathological image processing logic and an IC value) related to the artificial intelligence-based pathological image processing method provided in this embodiment of this application may be stored in the blockchain.

Figure 3:
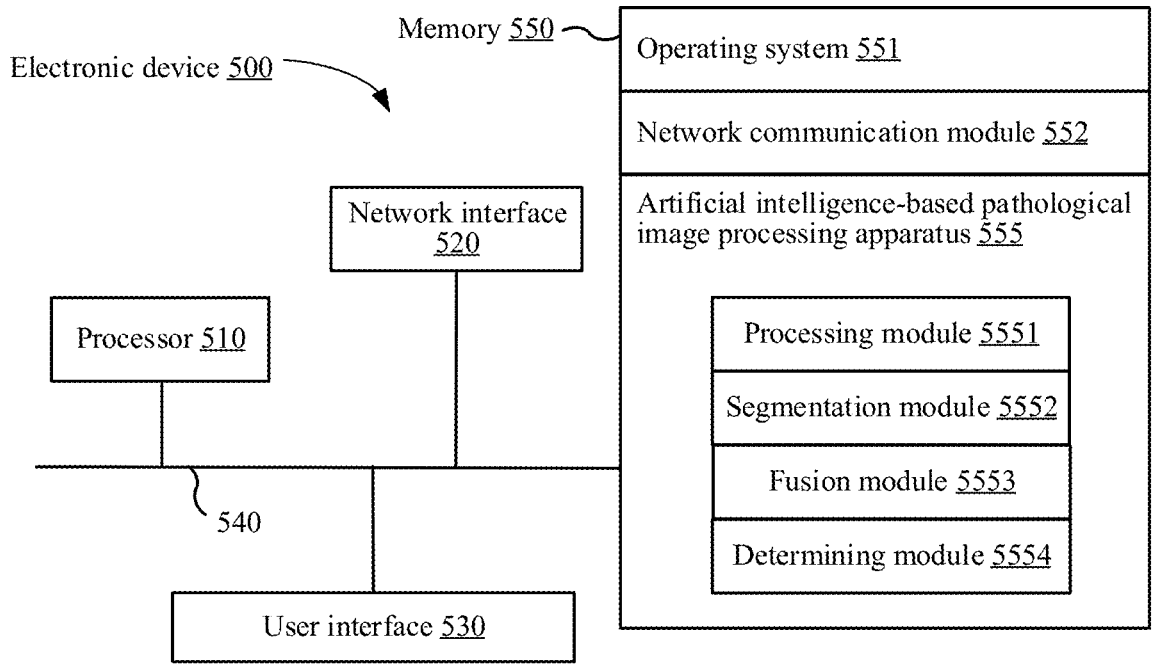
FIG. 3 is a schematic structural diagram of an electronic device 500 for processing a pathological image according to an embodiment of this application.

The following describes a structure of the electronic device for processing a pathological image provided in this embodiment of this application. FIG. 3 is a schematic structural diagram of an electronic device 500 for processing a pathological image according to an embodiment of this application. A description is made by using an example in which the electronic device 500 is a server. The electronic device 500 for image processing shown in FIG. 3 includes at least one processor 510, a memory 550, at least one network interface 520, and a user interface 530. All the components in the electronic device 500 are coupled together by using a bus system 540. It may be understood that the bus system 540 is configured to implement connection and communication between the components. In addition to a data bus, the bus system 540 further includes a power bus, a control bus, and a status signal bus. However, for ease of clear description, all types of buses are marked as the bus system 540 in FIG. 3.

The processor 510 may be an integrated circuit chip having a signal processing capability, for example, a general purpose processor, a digital signal processor (DSP), or another programmable logic device (PLD), discrete gate, transistor logical device, or discrete hardware component. The general purpose processor may be a microprocessor, any conventional processor, or the like.

The memory 550 includes a volatile memory or a non-volatile memory, or may include a volatile memory and a non-volatile memory. The non-volatile memory may be a read only memory (ROM), or may be a random access memory (RAM). The memory 550 described in this embodiment of this application is to include any other suitable type of memories. The memory 550 includes one or more storage devices physically away from the processor 510.

In some embodiments, the memory 550 can store data to support various operations, and examples of the data include programs, modules, and data structures, or subsets or supersets thereof, as illustrated below.

An operating system 551 includes a system program configured to process various basic system services and perform a hardware-related task, for example, a framework layer, a core library layer, and a driver layer, and is configured to implement various basic services and process a hardware-related task.

A network communication module 552 is configured to reach another computing device through one or more (wired or wireless) network interfaces 520. Exemplary network interfaces 520 include: Bluetooth, wireless compatible authentication (WiFi), a universal serial bus (USB), and the like.

In some embodiments, the artificial intelligence-based pathological image processing apparatus provided in this embodiment of this application may be implemented by using software such as the pathological image processing plug-in in the terminal or the pathological image processing service in the server. Certainly, this is not limited thereto. The artificial intelligence-based pathological image processing apparatus provided in this embodiment of this application may be implemented as various software embodiments, which include various forms such as an application, software, a software module, a script, or code.

FIG. 3 shows an artificial intelligence-based pathological image processing apparatus 555 stored in the memory 550. The artificial intelligence-based pathological image processing apparatus may be software in a form of a program, a plug-in, or the like, for example, a pathological image processing plug-in and include a series of modules such as a processing module 5551, a segmentation module 5552, a fusion module 5553, and a determining module 5554. The processing module 5551, the segmentation module 5552, the fusion module 5553, and the determining module 5554 are configured to implement the pathological image processing function provided in this embodiment of this application.

Figure 4A:
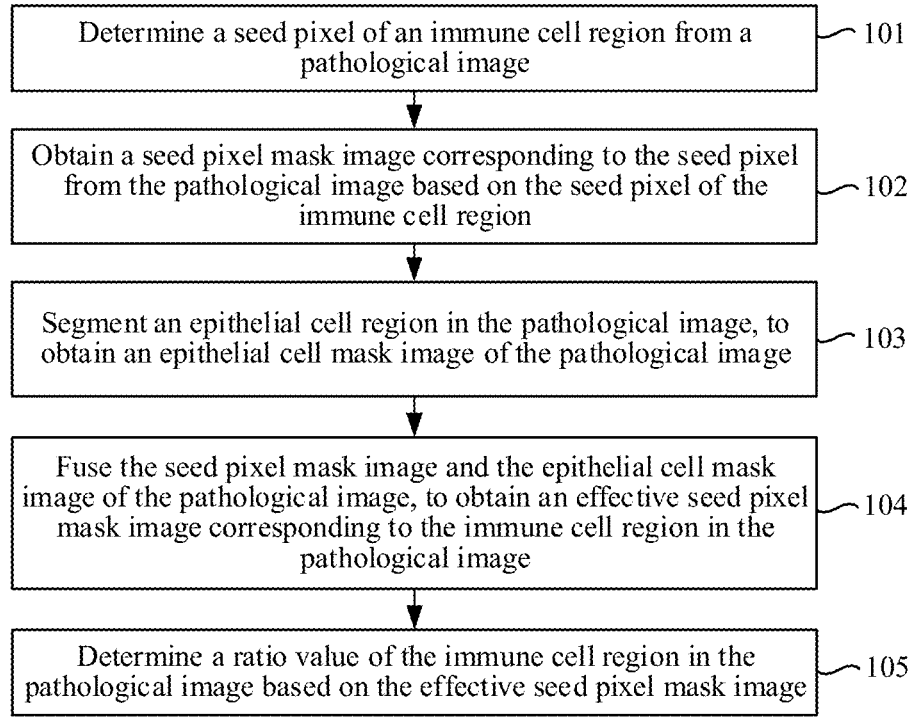
FIG. 4A to FIG. 4C are schematic flowcharts of an artificial intelligence-based pathological image processing method according to an embodiment of this application.

As described above, the artificial intelligence-based pathological image processing method provided in this embodiment of this application may be implemented by various electronic devices. FIG. 4A is a schematic flowchart of an artificial intelligence-based pathological image processing method according to an embodiment of this application. Descriptions is provided with reference to steps shown in FIG. 4A.

Step 101. Determine a seed pixel corresponding to an immune cell region from a pathological image.

For example, a pathological image (a WSI image) is obtained. The pathological image is acquired by using an image acquisition apparatus of a terminal or the pathological image is acquired by using an image acquisition device (a camera) independent of a terminal. The pathological image is a stained image. The image acquisition device sends the acquired pathological image to the terminal. The terminal forwards the pathological image to a server. After the pathological image is stained, an immune cell in the pathological image is stained. Therefore, the server may determine a seed pixel corresponding to the immune cell from the pathological image based on a pixel value of each pixel in the pathological image. That is, a cell corresponding to the seed pixel may be the immune cell. After determining the seed pixel corresponding to the immune cell, the server may subsequently perform fusion based on the seed pixel.

In some embodiments, the determining a seed pixel of an immune cell region from a pathological image includes: converting the pathological image from a first color space to a second color space, to obtain a pixel value of each pixel of the pathological image in the second color space; and determining, when a pixel value of a pixel in the second color space falls within a value range of the seed pixel, the pixel as the seed pixel corresponding to the immune cell region in the pathological image.

For example, the first color space is an RGB color space, and the second color space is a YUV color space. To better implement color segmentation, the pathological image may be converted from the RGB color space to the YUV color space, to obtain a pixel value of each pixel of the pathological image in the YUV color space. For a pixel i, a pixel value of the pixel i is y, u, and v. When $y \in [y_1, y_2]$, $u \in [u_1, u_2]$, and $v \in [v_1, v_2]$, the pixel i is a seed pixel corresponding to the immune cell region in the pathological image. The first color space is the YUV color space, and the second color space is the RGB color space. To better generalize color segmentation, the pathological image may be converted from the YUV color space to the RGB color space, to obtain a pixel value of each pixel of the pathological image in the RGB color space. For a pixel i, a pixel value of the pixel i is r, g, and b. When $r \in [r_1, r_2]$, $g \in [g_1, g_2]$, and $b \in [b_1, b_2]$, the pixel i is a seed pixel corresponding to the immune cell region in the pathological image.

Step 102. Obtain a seed pixel mask image corresponding to the seed pixel of the immune cell region from the pathological image based on the seed pixel of the immune cell region.

Figure 5:
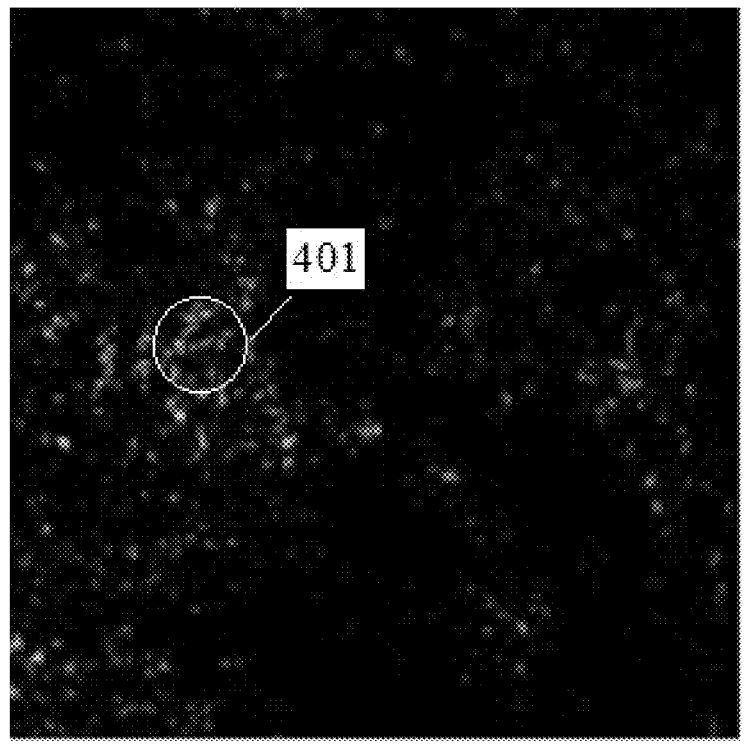
FIG. 5 is a seed pixel mask image according to an embodiment of this application.

For example, after determining seed pixels in the pathological image, the server combines the seed pixels, to obtain a seed pixel region, and sets pixel values of all the seed pixels in the seed pixel region to 1 and pixel values of pixels (non-seed pixels) in a non-seed pixel region in the pathological image to 0. Therefore, the seed pixels and the non-seed pixels are combined, to form a seed pixel mask image corresponding to the immune cell region in the pathological image. As shown in FIG. 5, white points 401 in an image represent seed pixels, and block points in the image represent non-seed pixels. A seed pixel mask image includes the seed pixels and the non-seed pixels.

Step 103. Segment an epithelial cell region in the pathological image, to obtain an epithelial cell mask image of the pathological image.

Figure 6:
FIG. 6 is an epithelial cell mask image according to an embodiment of this application.

There is no obvious sequential order between step 101 and step 102 and step 103. After obtaining the pathological image, the server segments an epithelial cell region in the pathological image based on a feature of an epithelial cell, to obtain epithelial cells in the pathological image, combines the epithelial cells, to obtain an epithelial cell region, and sets a pixel value of the epithelial cell region to 1 and a pixel value of a non-epithelial cell region in the pathological image to 0. Therefore, the epithelial cell region and the non-epithelial cell region are combined, to obtain an epithelial cell mask image of the pathological image. As shown in FIG. 6, a region 601 (a white region) represents an epithelial cell region, and the other region (a black region) represents a non-epithelial cell region. An epithelial cell mask image includes the epithelial cell region and the non-epithelial cell region.

Figure 4B:
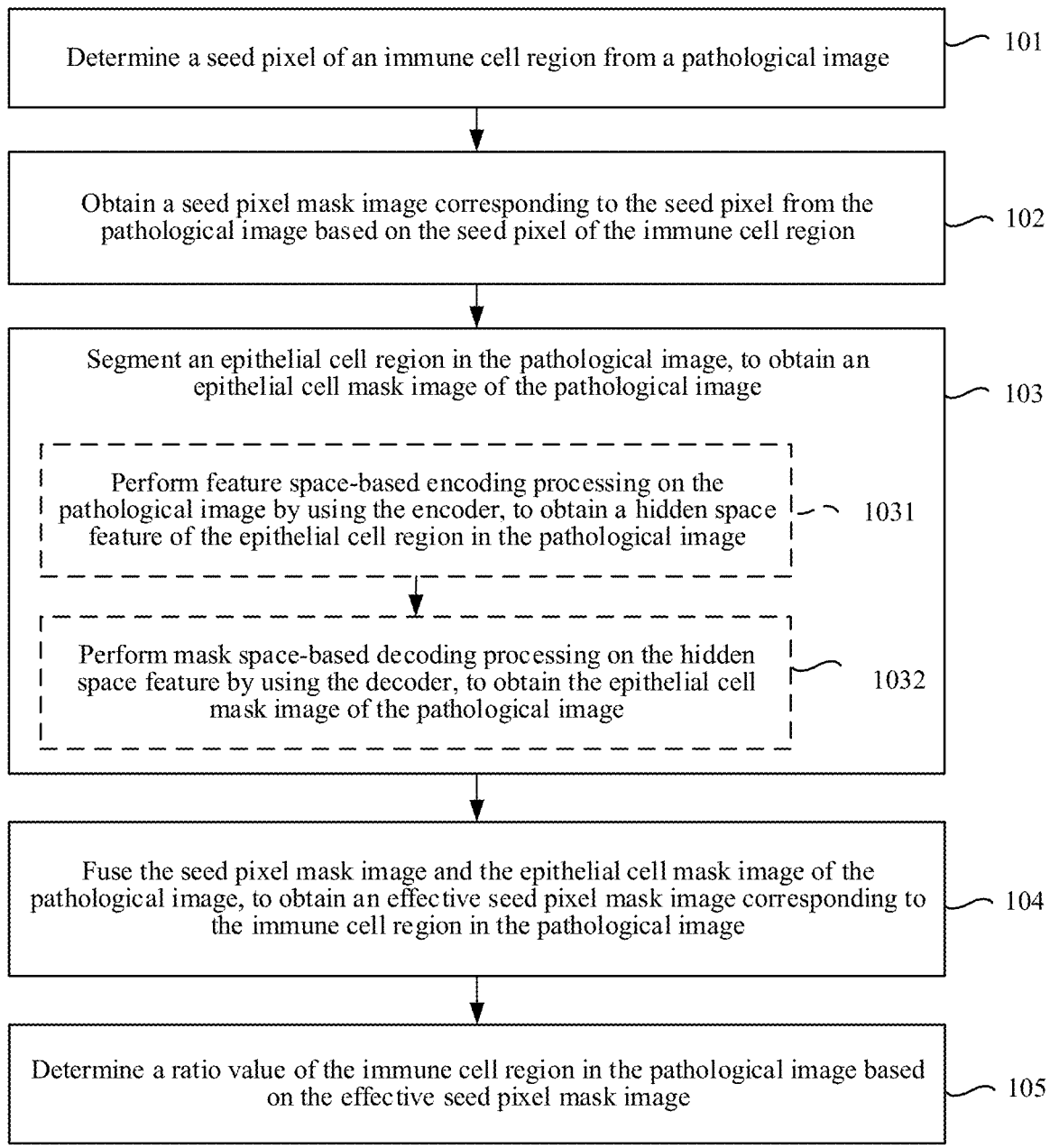

In this embodiment of this application, the epithelial cell region in the pathological image may be segmented by using a segmentation network, to obtain the epithelial cell mask image of the pathological image. The segmentation network configured to segment the epithelial cell region includes an encoder and a decoder. FIG. 4B is a schematic flowchart of an artificial intelligence-based pathological image processing method according to an embodiment of this application. Step 103 in FIG. 4A may be implemented by step 1031 and step 1032 shown in FIG. 4B. Step 1031. Perform feature space-based encoding on the pathological image by using the encoder, to obtain a hidden space feature of the epithelial cell region in the pathological image. Step 1032. Perform mask space-based decoding on the hidden space feature by using the decoder, to obtain the epithelial cell mask image of the pathological image.

For example, when the segmentation network includes an encoder and a decoder, feature space-based encoding processing may be performed on the pathological image by using the encoder, to implement feature extraction, so as to obtain a hidden space feature of the epithelial cell region in the pathological image. Subsequently, mask space-based decoding processing is performed on the hidden space feature of the epithelial cell region by using the decoder. Each pixel in the pathological image is mapped as a probability that a pixel is an epithelial cell pixel. When probabilities that pixels are the epithelial cell pixel are greater than an epithelial cell threshold, the pixels are determined as the epithelial cell pixels, and the determined epithelial cell pixels are combined to obtain the epithelial cell mask image of the pathological image.

In some embodiments, to avoid losing a detailed feature of an epithelial cell during encoding, encoding may be performed hierarchically, that is, the encoder includes a plurality of cascaded encoding layers. the performing feature space-based encoding on the pathological image by using the encoder, to obtain a hidden space feature of the epithelial cell region in the pathological image includes: performing downsampling encoding on the pathological image by using a first encoding layer in the plurality of cascaded encoding layers; outputting an encoding result of the first encoding layer to subsequent cascaded encoding layers, and continuing to perform downsampling encoding by using the subsequent cascaded encoding layers and outputting encoding results until an encoding result is outputted to the last encoding layer; and using an encoding result outputted by the last encoding layer as the hidden space feature of the epithelial cell region in the pathological image.

Figure 7:
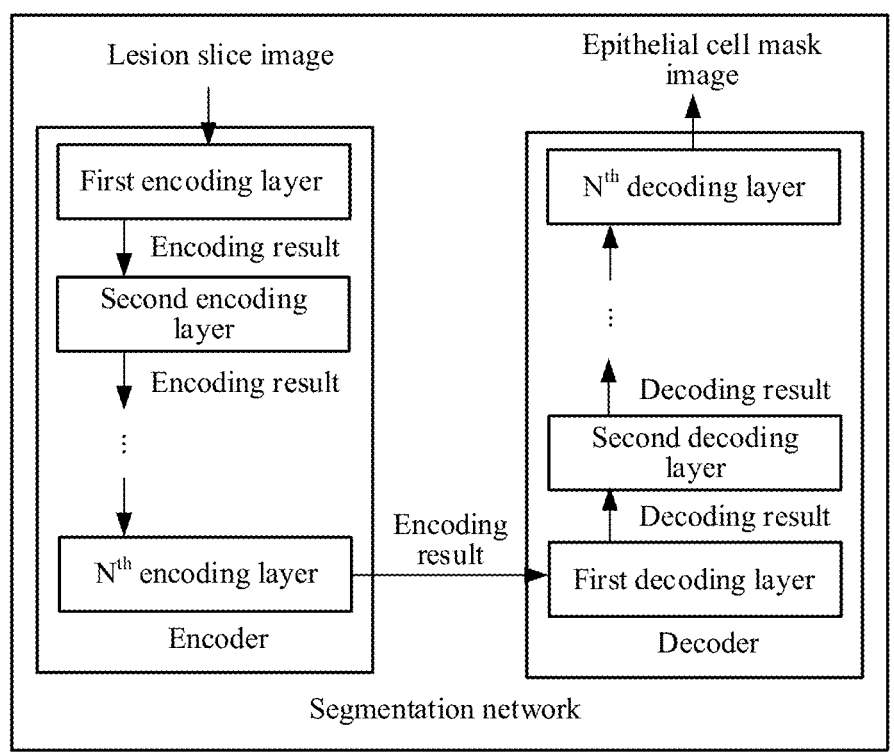
FIG. 7 is a schematic structural diagram of a segmentation network according to an embodiment of this application.

Continuing the foregoing example, as shown in FIG. 7, an encoder includes a plurality of cascaded encoding layers. A first encoding layer performs downsampling encoding on a pathological image and outputs an encoding result to a second encoding layer, and the second encoding layer continues to perform downsampling encoding and outputs an encoding result until an encoding result is outputted to an $N^{th}$ encoding layer. N is a total quantity of the plurality of cascaded encoding layers. The following processing operations are performed by using a $j^{th}$ encoding layer in the plurality of cascaded encoding layers, j being an increasing natural number and $2 \leq j < N$: performing encoding on an encoding result outputted by a $(j-1)^{th}$ encoding layer, to obtain a first encoding result of the $j^{th}$ encoding layer; combining the first encoding result of the $j^{th}$ encoding layer and the encoding result outputted by the $(j-1)^{th}$ encoding layer, to obtain a combination result of the $j^{th}$ encoding layer; performing encoding on the combination result of the $j^{th}$ encoding layer, to obtain a second encoding result of the $j^{th}$ encoding layer; combining the second encoding result of the $j^{th}$ encoding layer and the combination result of the $j^{th}$ encoding layer, to obtain an encoding result of the $j^{th}$ encoding layer; and outputting the encoding result of the $j^{th}$ encoding layer to a $(j+1)^{th}$ encoding layer.

Figure 8:
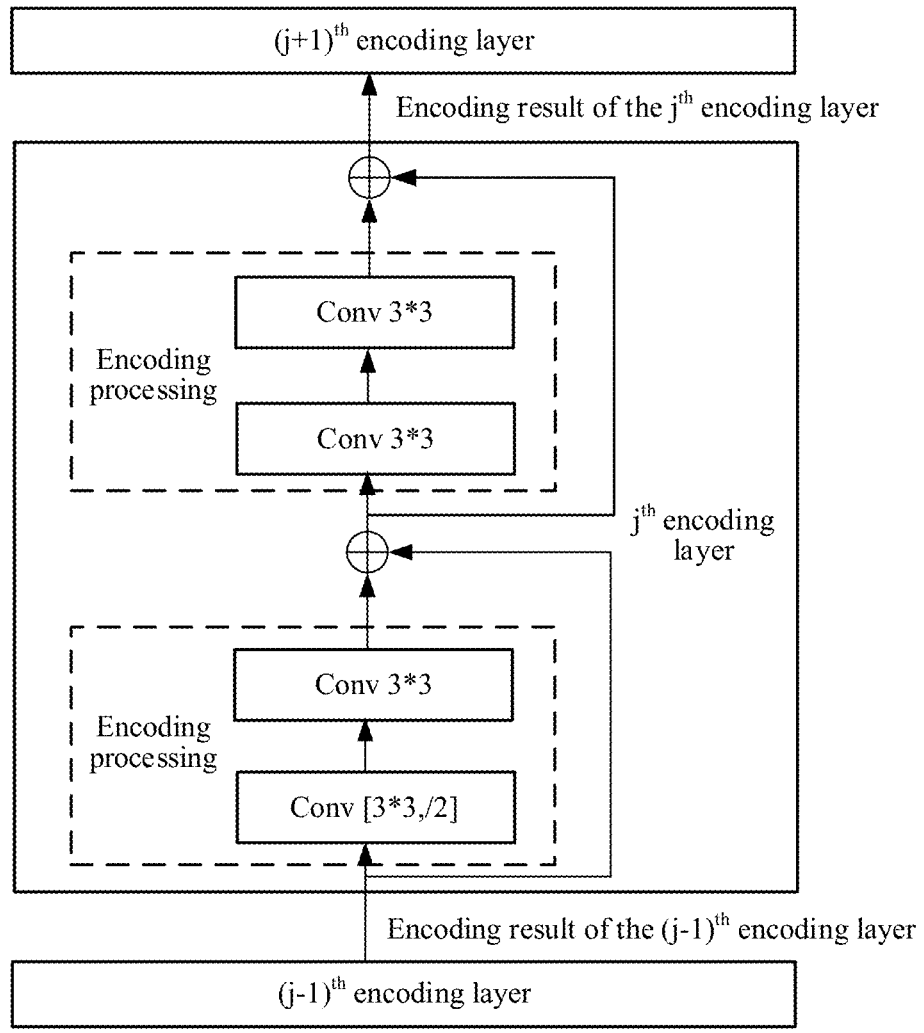
FIG. 8 is a schematic structural diagram of an encoding layer according to an embodiment of this application.

For example, as shown in FIG. 8, a $(j-1)^{th}$ encoding layer outputs an encoding result of the $(j-1)^{th}$ encoding layer to a $j^{th}$ encoding layer. The $j^{th}$ encoding layer first performs first encoding on the encoding result of the $(j-1)^{th}$ encoding layer (the first encoding is used for implementing a downsampling function), to obtain a first encoding result of the $j^{th}$ encoding layer. Subsequently, the $j^{th}$ encoding layer combines the first encoding result of the $j^{th}$ encoding layer and the encoding result outputted by the $(j-1)^{th}$ encoding layer, to obtain a combination result of the $j^{th}$ encoding layer. Next, the $j^{th}$ encoding layer performs second encoding processing (the second encoding is used for implementing a feature extraction function, for example, a convolution operation of which a convolution kernel is 3*3 is first performed, and then the convolution operation of which the convolution kernel is 3*3 is performed again) on the combination result of the $j^{th}$ encoding layer, to obtain a second encoding result of the $j^{th}$ encoding layer. Then, the $j^{th}$ encoding layer combines the second encoding result of the $j^{th}$ encoding layer and the combination result of the $j^{th}$ encoding layer, to obtain an encoding result of the $j^{th}$ encoding layer. Finally, the $j^{th}$ encoding layer outputs the encoding result of the $j^{th}$ encoding layer to a $(j+1)^{th}$ encoding layer.

In some embodiments, the performing encoding on an encoding result outputted by a $(j-1)^{th}$ encoding layer, to obtain a first encoding result of the $j^{th}$ encoding layer includes: performing downsampling processing on the encoding result outputted by the $(j-1)^{th}$ encoding layer, to obtain a downsampling result of the $j^{th}$ encoding layer; and performing convolution processing on the downsampling result of the $j^{th}$ encoding layer, to obtain the first encoding result of the $j^{th}$ encoding layer.

Continuing the foregoing example, as shown in FIG. 8, the $j^{th}$ encoding layer performs downsampling processing on the encoding result outputted by the $(j-1)^{th}$ encoding layer, to obtain a downsampling result of the $j^{th}$ encoding layer; and then performs a convolution operation of which a convolution kernel is 3*3 on the downsampling result of the $j^{th}$ encoding layer, to obtain the first encoding result of the $j^{th}$ encoding layer.

In some embodiments, to avoid losing the hidden space feature of the epithelial cell region, decoding may be performed hierarchically, that is, the decoder includes a plurality of cascaded decoding layers. the performing mask space-based decoding on the hidden space feature by using the decoder, to obtain the epithelial cell mask image of the pathological image includes: performing upsampling decoding on the hidden space feature by using a first decoding layer in the plurality of cascaded decoding layers; outputting a decoding result of the first decoding layer to subsequent cascaded decoding layers, and continuing to perform upsampling decoding by using the subsequent cascaded decoding layers and outputting decoding results until a decoding result is outputted to the last decoding layer; and mapping a decoding result outputted by the last decoding layer to a mask space, and using an obtained mapping result as the epithelial cell mask image of the pathological image.

Continuing the foregoing example, as shown in FIG. 7, a decoder includes a plurality of cascaded decoding layers. A first decoding layer performs upsampling decoding on the hidden space feature and outputs a decoding result to a second decoding layer, and the second decoding layer continues to perform upsampling decoding and outputs a decoding result until a decoding result is outputted to an $N^{th}$ decoding layer. N is a total quantity of the plurality of cascaded decoding layers. The following processing operations are performed by using an $i^{th}$ decoding layer in the plurality of cascaded decoding layers, i being an increasing natural number and $2 \leq i < N$: performing upsampling processing on a decoding result outputted by an $(i-1)^{th}$ decoding layer, to obtain an upsampling result of the $i^{th}$ decoding layer; performing convolution processing on the upsampling result of the $i^{th}$ decoding layer, to obtain a decoding result of the $i^{th}$ decoding layer; and outputting the decoding result of the $i^{th}$ decoding layer to an $(i+1)^{th}$ decoding layer.

In some embodiments, the performing upsampling processing on a decoding result outputted by an $(i-1)^{th}$ decoding layer, to obtain an upsampling result of the $i^{th}$ decoding layer includes: performing convolution processing on the decoding result outputted by the $(i-1)^{th}$ decoding layer, to obtain a first convolution result of the $i^{th}$ decoding layer; and performing full convolution processing on the first convolution result of the $i^{th}$ decoding layer, to obtain the upsampling result of the $i^{th}$ decoding layer.

Figure 9:
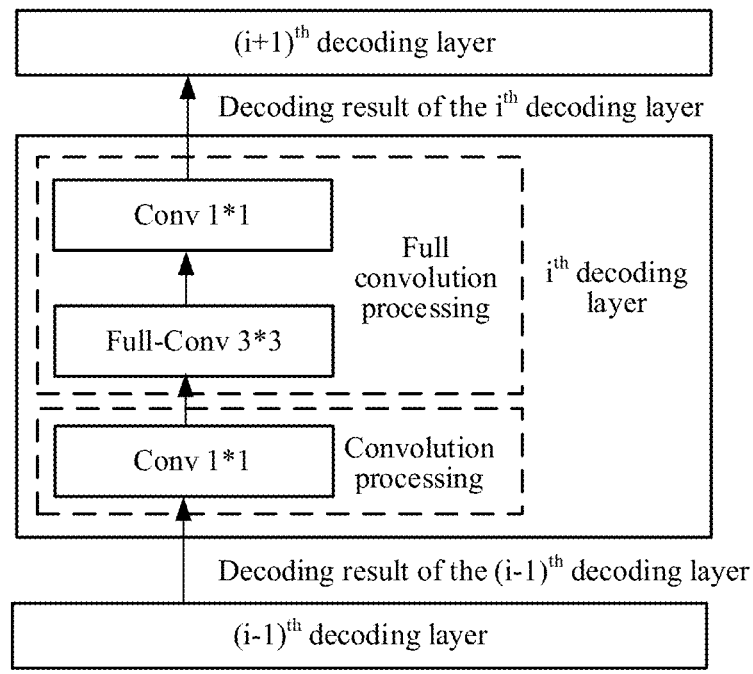
FIG. 9 is a schematic structural diagram of a decoding layer according to an embodiment of this application.

Continuing to the foregoing example, as shown in FIG. 9, an $(i-1)^{th}$ decoding layer outputs a decoding result of the $(i-1)^{th}$ decoding layer to an $i^{th}$ decoding layer. The $i^{th}$ decoding layer first performs convolution processing (for example, a convolution operation of which a convolution kernel is 1*1) on the decoding result outputted by the $(i-1)^{th}$ decoding layer, to obtain a first convolution result of the $i^{th}$ decoding layer, and then performs full convolution processing (for example, upsampling of which a convolution kernel is 3*3 is first performed, and then a convolution operation of a convolution kernel is 1*1 is performed) on the first convolution result of the $i^{th}$ decoding layer, to obtain an upsampling result of the $i^{th}$ decoding layer. The $i^{th}$ decoding layer outputs a decoding result to an $(i+1)^{th}$ decoding layer.

In some embodiments, when the decoder includes a plurality of cascaded decoding layers and a cross-layer connection exists between a decoding layer and an encoding layer that are in a same layer, the performing mask space-based decoding on the hidden space feature by using the decoder, to obtain the epithelial cell mask image of the pathological image includes: performing, by using a first decoding layer in the plurality of cascaded decoding layers, upsampling decoding on the hidden space feature outputted by an encoding layer that is in a cross-layer connection with the first decoding layer, and outputting a decoding result of the first decoding layer to a second decoding layer; splicing, by using the second decoding layer, the decoding result of the first decoding layer and an encoding result outputted by an encoding layer that is in a cross-layer connection with the second decoding layer, to obtain a splicing result of the second decoding layer; performing upsampling decoding on the splicing result of the second decoding layer by using the second decoding layer; outputting a decoding result of the second decoding layer to subsequent cascaded decoding layers, and continuing to perform splicing and upsampling decoding by using the subsequent cascaded decoding layers and outputting decoding results until a decoding result is outputted to the last decoding layer; and mapping a decoding result outputted by the last decoding layer to a mask space, and using an obtained mapping result as the epithelial cell mask image of the pathological image.

Figure 10:
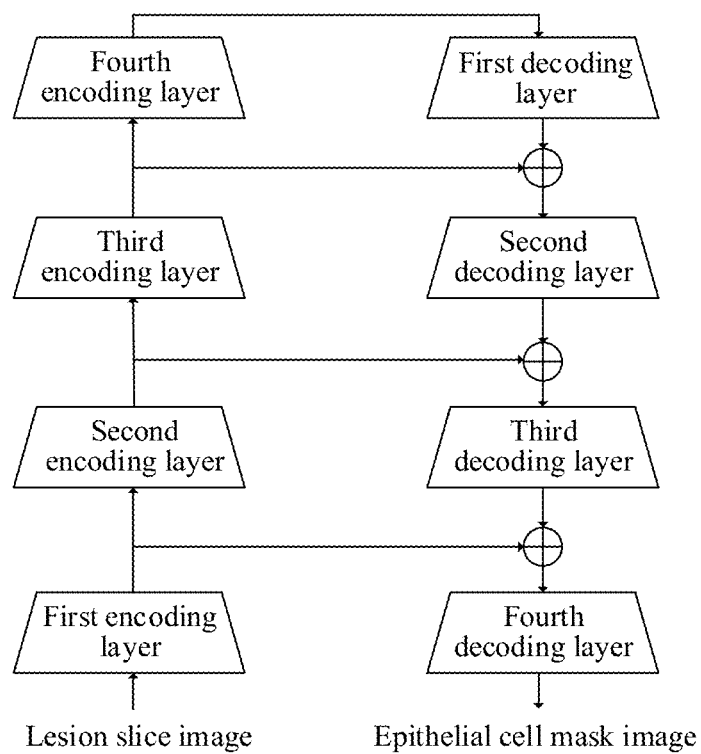
FIG. 10 is a schematic structural diagram of a segmentation network according to an embodiment of this application.

For example, as shown in FIG. 10, when the segmentation network has four encoding layers and four decoding layers, a first decoding layer performs upsampling decoding on a hidden space feature outputted by a fourth encoding layer that is in a cross-layer connection with the first decoding layer and outputs a decoding result of the first decoding layer to a second decoding layer. The decoding result of the first decoding layer and an encoding result outputted by a third encoding layer that is in a cross-layer connection with the second decoding layer are spliced by using the second decoding layer, to obtain a splicing result of the second decoding layer. Upsampling decoding is performed on the splicing result of the second decoding layer by using the second decoding layer, and a decoding result of the second decoding layer is outputted to a third decoding layer. The decoding result of the second decoding layer and an encoding result outputted by a second encoding layer that is in a cross-layer connection with the third decoding layer are spliced by using the third decoding layer, to obtain a splicing result of the third decoding layer. Upsampling decoding is performed on the splicing result of the third decoding layer by using the third decoding layer, and a decoding result of the third decoding layer is outputted to a fourth decoding layer. Finally, a decoding result outputted by the fourth decoding layer is mapped to a mask space, and an obtained mapping result is used as the epithelial cell mask image of the pathological image.

Step 104. Fuse the seed pixel mask image and the epithelial cell mask image of the pathological image, to obtain an effective seed pixel mask image corresponding to the immune cell region in the pathological image.

The seed pixel mask image includes stained immune cells and stained epithelial cells, and the epithelial cell mask image includes the stained epithelial cells. Therefore, to remove the stained epithelial cells from the seed pixel mask image, after obtaining the seed pixel mask image and the epithelial cell mask image, the server may fuse the seed pixel mask image and the epithelial cell mask image and remove the epithelial cells in the epithelial cell mask image from the seed pixel mask image, to form an effective seed pixel mask image corresponding to the immune cell region in the pathological image.

Figure 11:
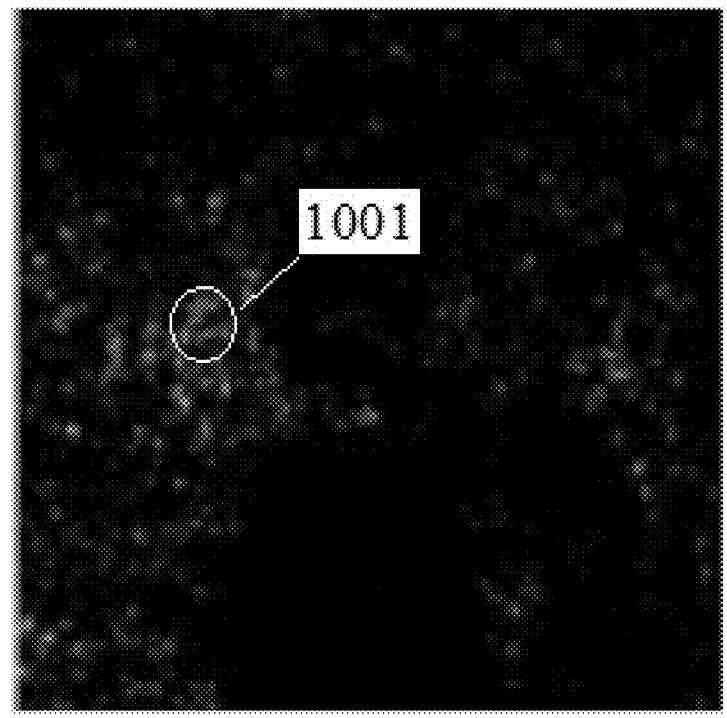
FIG. 11 is an effective seed pixel mask image according to an embodiment of this application.

For example, as shown in FIG. 11, a seed pixel mask image and an epithelial cell mask image are fused, to obtain an effective seed pixel mask image. White points 1001 in FIG. 11 are less than the white points 401 in FIG. 5, that is, pixels corresponding to epithelial cells are removed from the seed pixel mask image, to form the effective seed pixel mask image including only effective seed pixels (immune cell pixels).

Figure 4C:
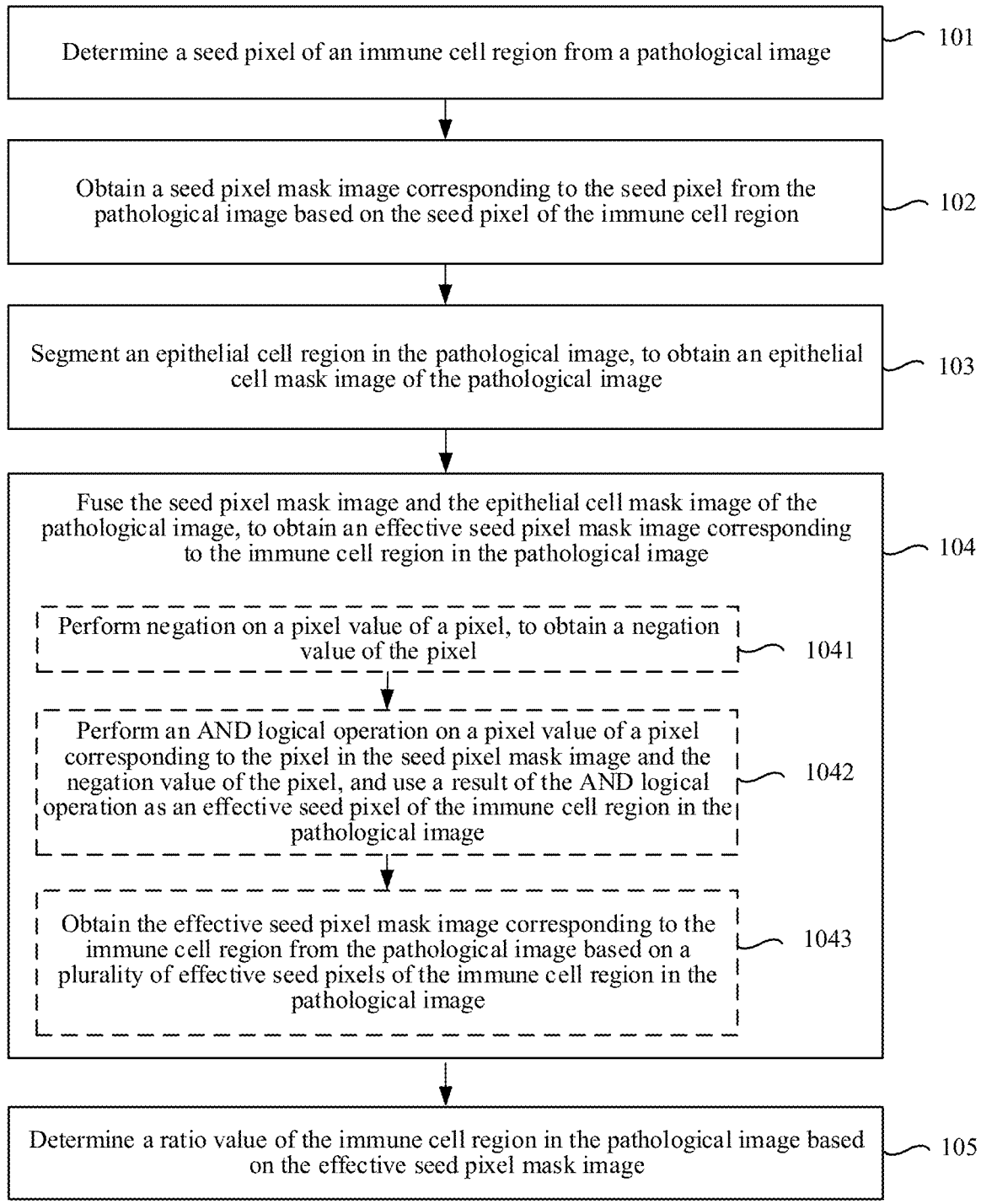

FIG. 4C is a schematic flowchart of an artificial intelligence-based pathological image processing method according to an embodiment of this application. Step 104 in FIG. 4A may be implemented by step 1041 to step 1043 shown in FIG. 4C. The following processing operations are performed for each pixel in the epithelial cell mask image of the pathological image. Step 1041. Perform negation on a pixel value of a pixel, to obtain a negation value of the pixel. Step 1042. Perform an AND logical operation on a pixel value of a pixel corresponding to the pixel in the seed pixel mask image and the negation value of the pixel, and use a result of the AND logical operation as an effective seed pixel of the immune cell region in the pathological image. Step 1043. Obtain the effective seed pixel mask image corresponding to the immune cell region from the pathological image based on a plurality of effective seed pixels of the immune cell region in the pathological image.

For example, after obtaining the seed pixel mask image and the epithelial cell mask image (a size of the seed pixel mask image is the same as a size of the epithelial cell mask image and a size of the pathological image), the server performs the following processing operations for any pixel k in the epithelial cell mask image of the pathological image: performing negation on a pixel value of the pixel k, to obtain a negation value of the pixel k, performing an AND logical operation on a pixel value of a pixel corresponding to the pixel k in the seed pixel mask image and the negation value of the pixel k, using the pixel k as an effective seed pixel of the immune cell region in the pathological image when a result of the AND logical operation is 1, that is, a pixel value of the effective seed pixel is 1, and combining the effective seed pixel in the pathological image and a pixel (a non-effective seed pixel) other than the effective seed pixel, to obtain an effective seed pixel mask image corresponding to the immune cell region in the pathological image.

For example, when the pixel value of the pixel k in the epithelial cell mask image is 1 (which indicates that the corresponding pixel k in the pathological image is an epithelial cell pixel), and the pixel value of the pixel corresponding to the pixel k in the seed pixel mask image is 1 (which indicates that the corresponding pixel k in the pathological image may be a stained immune cell pixel), negation is performed on the pixel value of the pixel k in the epithelial cell mask image, and the AND logical operation is performed on the pixel value of the pixel corresponding to the pixel k in the seed pixel mask image and the negation value of the pixel k, to obtain a result of the AND logical operation of 0, indicating that the pixel k is a non-immune cell pixel in the pathological image. When the pixel value of the pixel k in the epithelial cell mask image is 0 (which indicates that the corresponding pixel k in the pathological image is a non-epithelial cell pixel), and the pixel value of the pixel corresponding to the pixel k in the seed pixel mask image is 1 (which indicates that the corresponding pixel k in the pathological image may be the stained immune cell pixel), negation is performed on the pixel value of the pixel k in the epithelial cell mask image, and the AND logical operation is performed on the pixel value of the pixel corresponding to the pixel k in the seed pixel mask image and the negation value of the pixel k, to obtain a result of the AND logical operation of 1, indicating that the pixel k is the immune cell pixel in the pathological image, that is, the effective seed pixel.

In some embodiments, to avoid detecting whether all pixels in the pathological image are effective seed pixels, only some pixels are detected. Therefore, the fusing the seed pixel mask image and the epithelial cell mask image of the pathological image, to obtain an effective seed pixel mask image corresponding to the immune cell region in the pathological image includes: determining a seed pixel region in the seed pixel mask image; determining the epithelial cell region in the epithelial cell mask image of the pathological image; and removing the epithelial cell region from the seed pixel region, to obtain the effective seed pixel mask image corresponding to the immune cell region in the pathological image.

For example, a seed pixel region (that is, a region formed by pixels of which corresponding pixel values are 1) in the seed pixel mask image includes stained immune cells and stained epithelial cells, a non-seed pixel region definitely does not include the stained immune cells, and an epithelial cell region in the epithelial cell mask image definitely includes epithelial cells. Therefore, only the seed pixel region needs to be detected, to remove the stained epithelial cells. That is, the epithelial cell region is removed from the seed pixel region, to obtain the effective seed pixel mask image corresponding to the immune cell region in the pathological image.

In some embodiments, the removing the epithelial cell region from the seed pixel region, to obtain the effective seed pixel mask image corresponding to the immune cell region in the pathological image includes: performing the following processing operations for each pixel in the seed pixel region: performing negation on a pixel value of a corresponding pixel in the epithelial cell region, to obtain a negation value of the pixel; performing an AND logical operation on a pixel value of a pixel in the seed pixel region and the negation value of the pixel, and using a result of the AND logical operation as an effective seed pixel of the immune cell region in the pathological image; and obtaining the effective seed pixel mask image corresponding to the immune cell region from the pathological image based on a plurality of effective seed pixels of the immune cell region in the pathological image.

For example, when a pixel value of a pixel g in the seed pixel region is 1 (which indicates that the corresponding pixel g in the pathological image may be a stained immune cell pixel), and a pixel value of a pixel corresponding to the pixel g in the epithelial cell region is 1 (which indicates that the corresponding pixel g in the pathological image is a stained epithelial cell pixel), negation is performed on a pixel value of a pixel g in the epithelial cell region, and an AND logical operation is performed on the pixel value of the corresponding pixel g in the seed pixel region and the negation value of the pixel g, to obtain a result of the AND logical operation of 0, indicating that the pixel g is a non-immune cell pixel in the pathological image. When the pixel value of the pixel g in the seed pixel region is 1 (which indicates that the corresponding pixel g in the pathological image may be the stained immune cell pixel), and the pixel value of the pixel corresponding to the pixel g in the epithelial cell region is 0 (which indicates that the corresponding pixel g in the pathological image is a non-epithelial cell pixel), negation is performed on the pixel value of the pixel g in the epithelial cell region, and the AND logical operation is performed on the pixel value of the corresponding pixel g in the seed pixel region and the negation value of the pixel g, to obtain a result of the AND logical operation of 1, indicating that the pixel g is an immune cell pixel in the pathological image, that is, the effective seed pixel.

Step 105. Determine a ratio value of the immune cell region in the pathological image based on the effective seed pixel mask image.

For example, after obtaining the effective seed pixel mask image, the server determines a quantity of effective seed pixels in the effective seed pixel mask image and determines a quantity of all pixels in the effective seed pixel mask image, and finally uses a ratio of the quantity of effective seed pixels to the quantity of all pixels as a ratio value of the immune cell region in the pathological image, that is, an accurate IC value may be obtained, to quantify the IC value.

After obtaining the IC value, the server may query another pathological image (a slice reference image) having an IC value the same as the IC value in a database based on the IC value and return the pathological image, the corresponding IC value, and the slice reference image to a health medical client, to assist a doctor and a patient in disease prediction and re-diagnosis. The artificial intelligence-based pathological image processing method provided in this embodiment of this application is not aimed at living or animal bodies, and is not for a direct purpose of obtaining disease diagnosis results or health conditions. Therefore, the disease diagnosis results or the health conditions cannot be directly obtained according to the IC value, and the IC value is only used for assisting the doctor and the patient in disease prediction and re-diagnosis.

In some embodiments, to effectively remove noise of the effective seed pixel mask image, the determining a ratio value of the immune cell region in the pathological image based on the effective seed pixel mask image includes: performing morphological processing on the effective seed pixel mask image, to obtain a morphological effective seed pixel mask image; determining a first quantity of effective seed pixels in the morphological effective seed pixel mask image; determining a second quantity of all pixels in the morphological effective seed pixel mask image; and using a ratio of the first quantity of effective seed pixels to the second quantity of all pixels as the ratio value of the immune cell region in the pathological image.

For example, an opening operation is first performed on the effective seed pixel mask image, to remove an isolated abnormal value greater than an intra-field point in the effective seed pixel mask image, and then a dilation operation is performed, to remove an isolated abnormal value less than the intra-field point in the effective seed pixel mask image, to obtain a morphological effective seed pixel mask image, thereby implementing a denoising function. After obtaining the morphological effective seed pixel mask image, the server determines a quantity of effective seed pixels in the morphological effective seed pixel mask image and determines a quantity of all pixels in the morphological effective seed pixel mask image, and finally uses a ratio of the quantity of effective seed pixels to the quantity of all pixels as the ratio value of the immune cell region in the pathological image, that is, an accurate IC value may be obtained, to quantify the IC value.

The following describes an exemplary application of this embodiment of this application in an actual application scenario.

This embodiment of this application is applicable to application scenarios of various medical research. As shown in FIG. 2, the terminal 200 is connected to the server 100 deployed in the cloud through the network 300, and a medical research application is installed on the terminal 200. After a prediction request for a pathological image (a WSI image) is obtained, a pathological image processing interface of the server 100 is invoked. The server 100 performs a series of processing operations on the pathological image according to the prediction request, to obtain an IC value for doctors and research fellows to perform tumor treatment research based on the IC value.

The related art has the following problems: (1) An interpretation result is an overall result for the patch example image rather than a pixel-based result and has relatively low interpretation accuracy. (2) There are only two interpretation results, that is, greater than or equal to 1% or less than 1%, and a more precise specific IC value cannot be given. For example, a specific IC value is not given for a patch image greater than or equal to 1%.

To resolve the problems, an embodiment of this application provides an immune cell auxiliary interpretation method (that is, the artificial intelligence-based pathological image processing method) for a breast PD-L1 method. Stained ICs in an epithelial cell region are filtered, to obtain effective IC seed pixels, the effective IC seed pixels are converted into a mask image for IC scoring, and an IC ratio value is obtained based on the mask image, to assist a doctor in interpreting the IC value and help doctor improve accuracy of IC value interpretation. Simultaneously, consistency between IC values interpreted by group doctors is improved.

Medically, there is a clinically meaningful improvement in a PD-L1 expression in 1% or more of population. Therefore, an objective, reproducible, and accurate PD-L1 assessment method is required to assist in diagnosis of the doctor. In this embodiment of this application, a current situation may be improved based on digital image analysis. In this embodiment of this application, cell positions of ICs and a proportion of the ICs in a tumor region may be predicted, to obtain an IC value. During the diagnosis of pathologists, on the basis of viewing a patch image of WSI and the IC value estimated by using the auxiliary method at the same time, the IC value is scored, thereby improving the accuracy of IC scoring. Simultaneously, in this embodiment of this application, a problem that a plurality of doctors performs scoring inconsistently may further be resolved.

Figure 12:
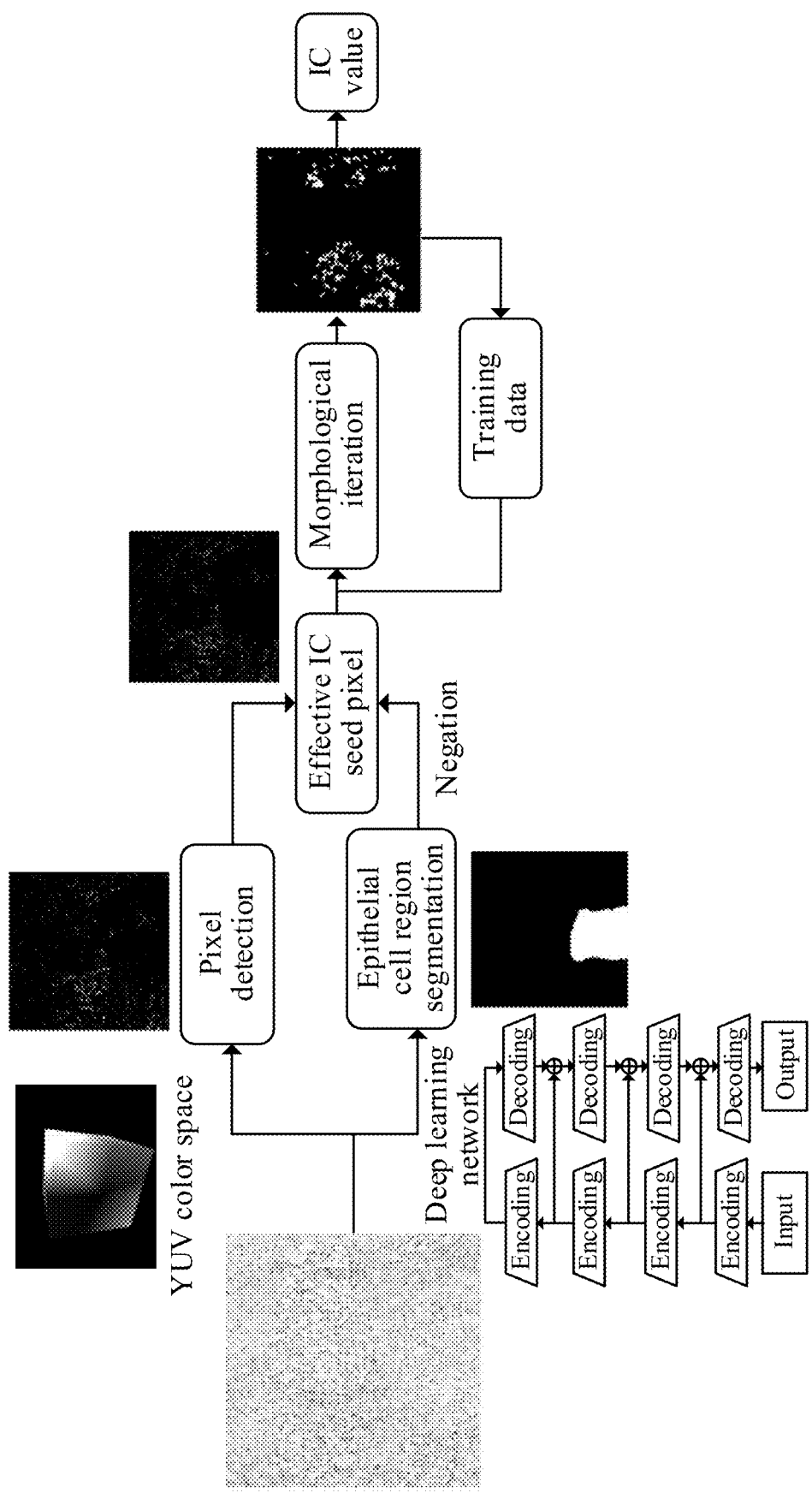
FIG. 12 is a schematic structural diagram of an artificial intelligence auxiliary model according to an embodiment of this application.

As shown in FIG. 12, the auxiliary interpretation method (an AI auxiliary model) provided in this embodiment of this application includes several steps, which are as follows: Step (1) Detect pixels of stained ICs, that is, seed pixels of a to-be-detect complete IC region. Step (2) Segment an epithelial cell region, where stained ICs in the epithelial cell region are invalid according to a definition of an effective IC and need to be filtered, to form effective IC seed pixels. Step (3) Perform denoising on the effective IC seed pixels and convert the effective IC seed pixels into a mask image used for IC scoring. IC value fitting may be performed by using image sin a Roche guideline document as a training data set, that is, a morphological operation is iterated, and finally an IC region is obtained to further obtain an IC ratio value. The following three steps in the auxiliary interpretation method are explained:

Step (1) Detection of Pixels of Stained Immune Cells (ICs)

As shown in FIG. 12, an input of this portion is a patch image of WSI, and an output is a binary mask image $M_{seed}(x,y)$, representing a seed pixel in an IC region.

By learning the image in the Roche guideline document, a color range of an RGB color space of the stained IC pixels is obtained, that is, $R \in [r_1,r_2]$, $G \in [g_1,g_2]$, and $B \in [b_1,b_2]$, r, g, and b being pixel values. In order to better implement color segmentation, the ICs may be converted from the RGB color space to a YUV color space to obtain a value range of the IC pixels in the YUV color space, that is, $Y \in [y_1,y_2]$, $U \in [u_1,u_2]$, and $V \in [v_1,v_2]$ and in the patch image, pixels belonging to $Y \in [y_1,y_2]$, $U \in [u_1,u_2]$, and $V \in [v_1,v_2]$ are used as white points (pixel values are 1) for outputting the binary mask image. Pixels that do not belong to $Y \in [y_1,y_2]$, $U \in [u_1,u_2]$, and $V \in [v_1,v_2]$ are used as black points (pixel values are 0) for outputting the binary mask image. Herein, the outputted binary mask image of the seed pixels in the IC region is used as $M_{seed}(x,y)$ (a seed pixel mask image).

Step (2) Epithelial Cell Region Segmentation

As shown in FIG. 12, an input of this portion is a patch image of WSI, and an output is an epithelial cell region binary image $M_{epithelium}(x,y)$ and an effective IC seed region $M_{effitive}(x,y)$.

By using a pre-trained deep learning network (for example, an encoder representation-based high-efficient semantic segmentation network), pixel-level segmentation is performed on an epithelial cell region of the patch image, and the encoder representation-based high-efficient semantic segmentation network may well balance calculation efficiency and precision, and can quickly and effectively perform inference under the condition of ensuring reliable precision.

Epithelial cell detection is performed by using the encoder representation-based high-efficient semantic segmentation network (a segmentation network model). A training data set used herein is 2700 or more labeled immunohistochemical images with image parameters being 832*832 pixels, and each pixel length is 0.848 micrometers. The segmentation network model is from labeling data of three modalities of an immunohistochemical estrogen receptor (ER), a progesterone receptor (PR), and an antigen KI-67. Image features of epithelial regions in the ER modality, the PR modality, and the KI-67 modality are similar to an image feature of an epithelial region in a PD-L1 modality from an image level. Therefore, in the absence of labeling and training data of the epithelial region in the PD-L1 modality, the epithelial region of PD-L1 modality data may be directly detected by using an epithelial segmentation model trained by using other immunohistochemical modalities, or the epithelial region of the PD-L1 may be well obtained.

Herein, the output epithelial cell region binary image is used as $M_{epithelium}(x,y)$ (an epithelial cell mask image). Further, an intersection of the two mask images of $M_{seed}(x,y)$ and the negated $M_{epithelium}(x,y)$ is calculated, to obtain an effective IC seed region binary mask image $M_{effitive}(x,y)$ (an effective seed pixel mask image). A calculation formula of $M_{effitive}(x,y)$ is shown in formula (1):

$$M_{effitive}(x,y) = M_{seed}(x,y) \cap \mathrm{Inv}(M_{epithelium}(x,y)) \quad (1)$$

where Inv[ ] represents a negation operation.

Step (3) IC Region Calculation and IC Value Obtaining

As shown in FIG. 12, an input of this portion is an IC seed region binary mask image, and an output is an IC region binary mask image $M_{IC}(x,y)$ and an IC value.

Based on $M_{epithelium}(x,y)$, image morphological operations (an opening operation and a dilation operation) are performed. The dilation operation is used for eliminating the isolated abnormal values less than the intra-field point, and the opening operation is used for eliminating the isolated abnormal value greater than the intra-field point. Then, a ratio of a white region on $M_{epithelium}(x,y)$ after the image morphological operations occupying the entire image is calculated. Herein, the entire image is regarded as a tumor region, and therefore the obtained ratio value is an estimated IC value. Step 1 and step 2 are performed by using the image in the Roche guideline document to obtain a preliminary IC value. If a difference between the IC value and the image in the Roche guideline document is relatively large (the difference is greater than i %), the image morphological operations (opening and dilation) are further iterated. It is determined that an iteration parameter used in this embodiment of this application is two times and a size of a kernel used for the morphological operations is 3*3. A final IC region binary mask image $M_{IC}(x,y)$ is obtained based on the parameter. Further, an IC value calculation formula is shown in formula (2):

$$IC\ \mathrm{score} = \frac{\mathrm{sum\_pixel}[M_{IC}(x,y) = 1]}{\mathrm{sum\_pixel}[M_{IC}(x,y)]} \quad (2)$$

where sum_pixel[ ] represents that a quantity of pixels in an image is accumulated and calculated and an IC score represents an IC value.

The IC value result predicted in this embodiment of this application may be used for providing auxiliary information to a doctor, so as to calculate a final IC value result.

Figure 13A:
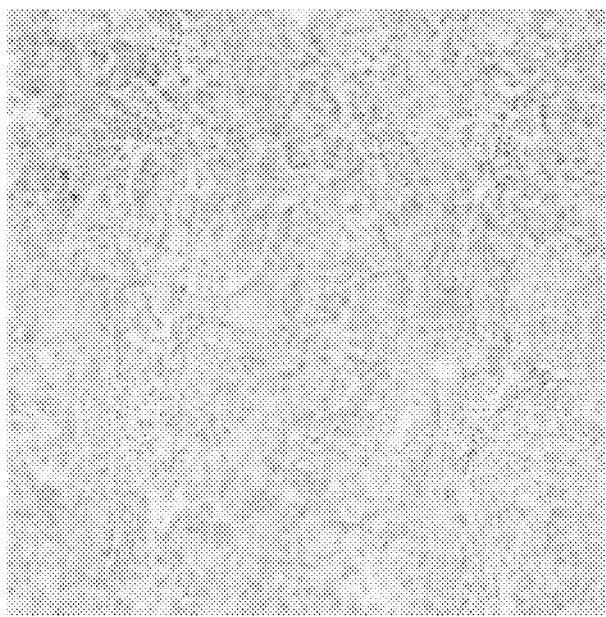
FIG. 13A is an input image according to an embodiment of this application.

Through some experiments and analysis, it is determined that this embodiment of this application can help the doctor improve IC value interpretation accuracy. Simultaneously, consistency between IC values interpreted by group doctors is improved. Beneficial effects are as follows:

As shown in FIG. 13A, a patch image is inputted. The patch image in FIG. 13A is detected, to detect a black region 1301 shown in FIG. 13B. The black region 1301 represents a detected IC region. The patch image in FIG. 13A is segmented, to obtain an epithelial cell region binary image $M_{epithelium}(x,y)$ shown in FIG. 13C. A white region 1302 represents an epithelial cell region. Image morphological operations are performed based on $M_{epithelium}(x,y)$, to obtain an IC region binary mask image $M_{IC}(x,y)$ shown in FIG. 13D. A white region 1303 represents an IC region including seed pixels. According to the algorithm in this embodiment of this application, an estimated IC value is obtained as 0.14% (an actual IC value<1%), that is, the estimation is accurate.

Figure 14B:
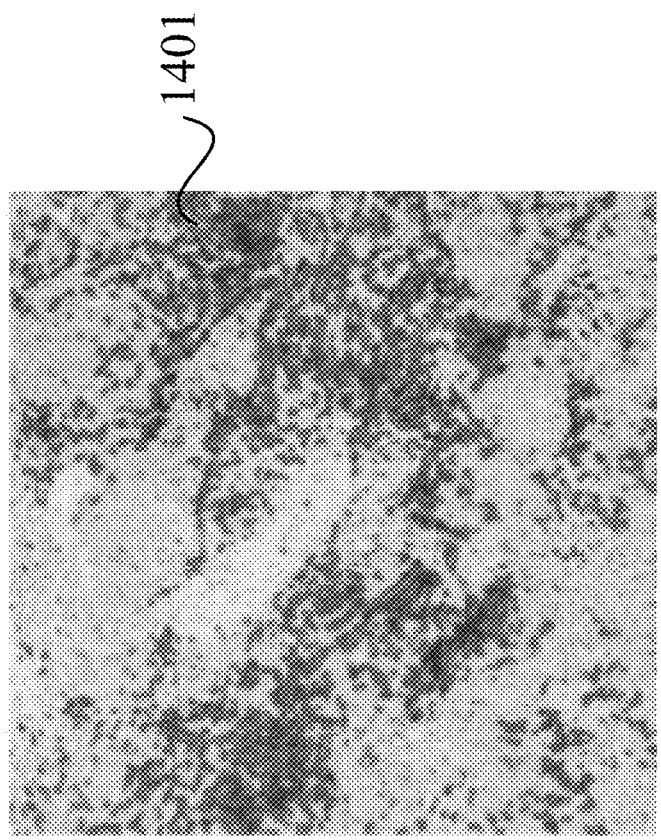
FIG. 14B is a schematic diagram of an IC region according to an embodiment of this application.
Figure 14A:
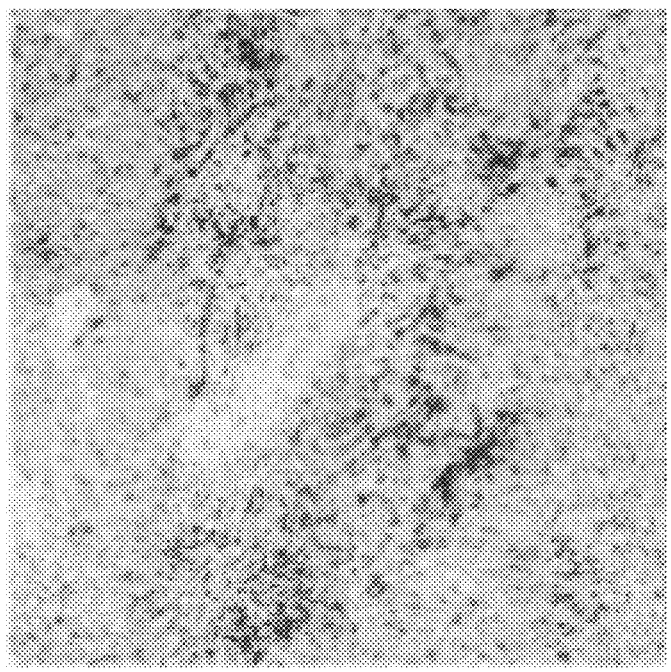
FIG. 14A is an input image according to an embodiment of this application.
Figure 14D:
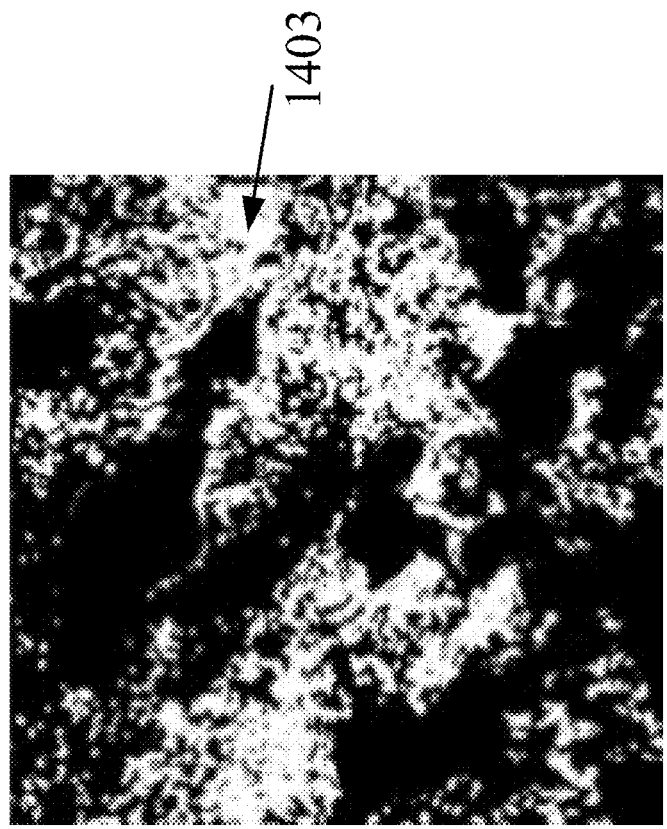
FIG. 14D is an IC region binary mask image according to an embodiment of this application.
Figure 14C:
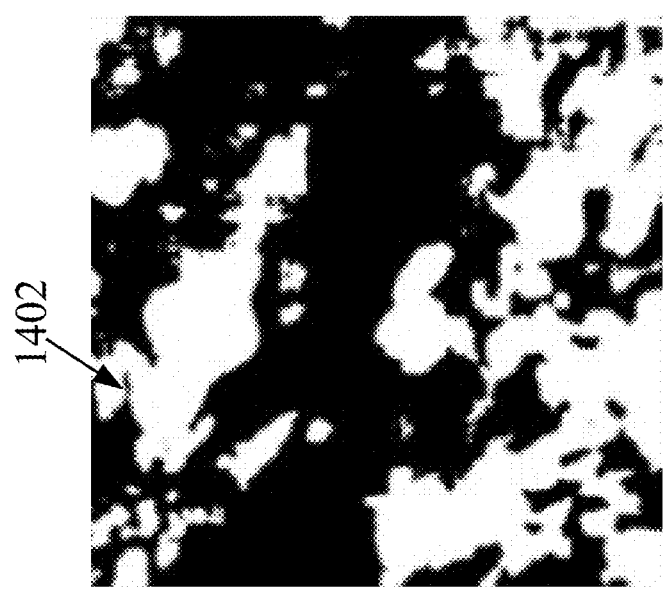
FIG. 14C is an epithelial cell region binary image according to an embodiment of this application.

As shown in FIG. 14A, a patch image is inputted. The patch image in FIG. 14A is detected, to detect a black region 1401 shown in FIG. 14B. The black region 1401 represents a detected IC region. The patch image in FIG. 14A is segmented, to obtain an epithelial cell region binary image $M_{epithelium}(x,y)$ shown in FIG. 14C. A white region 1402 represents an epithelial cell region. Image morphological operations are performed based on $M_{epithelium}(x,y)$ to obtain an IC region binary mask image $M_{IC}(x,y)$ shown in FIG. 14D. A white region 1403 represents an IC region including seed pixels. According to the algorithm in this embodiment of this application, an estimated IC value is obtained as 31.9% (an actual IC value>10%), that is, the estimation is accurate.

For accuracy analysis: in WSI data of 100 patients, 109 test patch images are used and gold standards, that is, two gold standards, are formulated for these images. The first gold standard is to classify the value of the IC score as four classes, and IC value intervals defined in the four classes are: class 1 [0%, 1%), class 2 [1%, 5%), class 3 [5%, 10%), and class 4 [10%, 100%]. The second gold standard is to classify the value of the IC score into two classes, and IC value intervals defined in the two classes are: [0%, 1%) and [1%, 100%]. The first gold standard is of medical research significance, and the second gold standard is of clinical diagnosis significance. In this embodiment of this application, the accuracy under the two gold standards is shown in Table 1:

TABLE 1

Accuracy of AI Auxiliary Model

|  | Accuracy | AUC | F1 score (weights based on a quantity of classes) |
|---|---|---|---|
| First gold standard: four intervals | 0.752 | 0.797 | 0.764 |
| Second gold standard: two intervals | 0.963 | 0.888 | 0.962 |

Figure 13B:
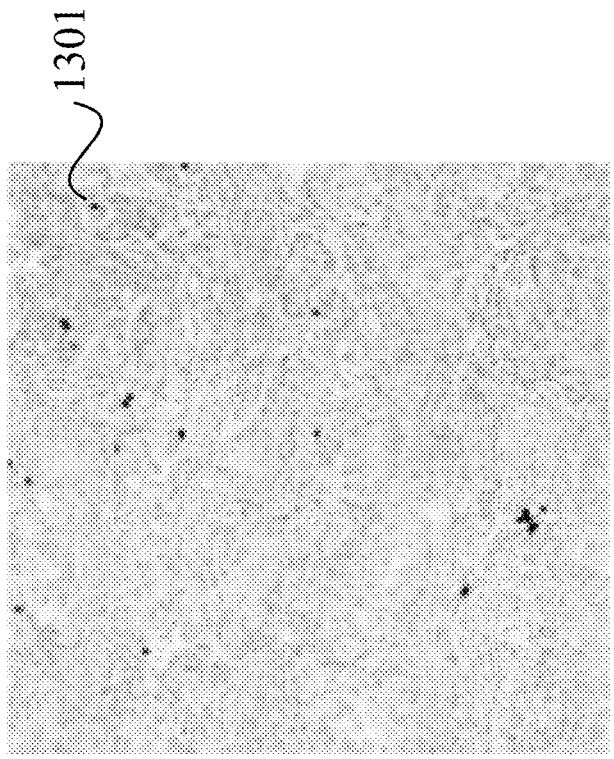
FIG. 13B is a schematic diagram of an IC region according to an embodiment of this application.
Figure 13D:
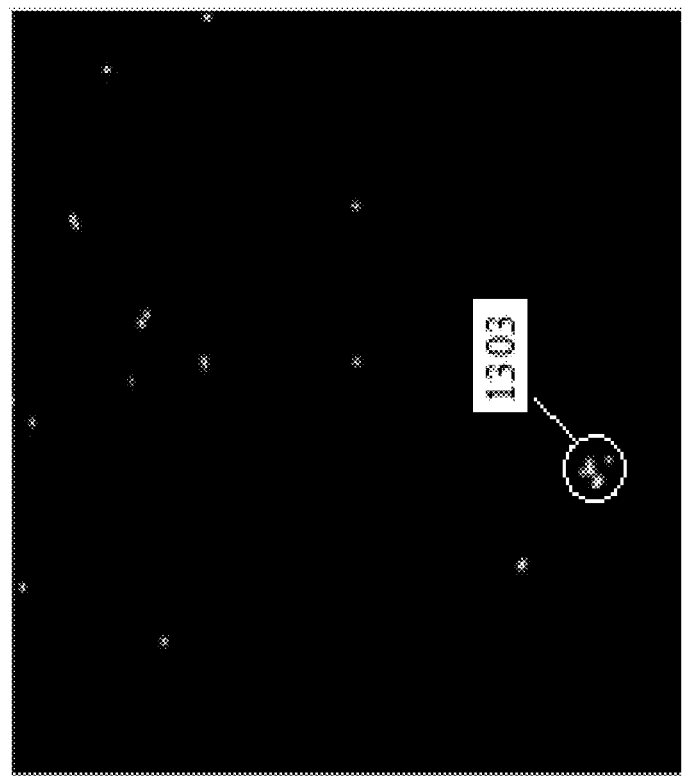
FIG. 13D is an IC region binary mask image according to an embodiment of this application.
Figure 13C:
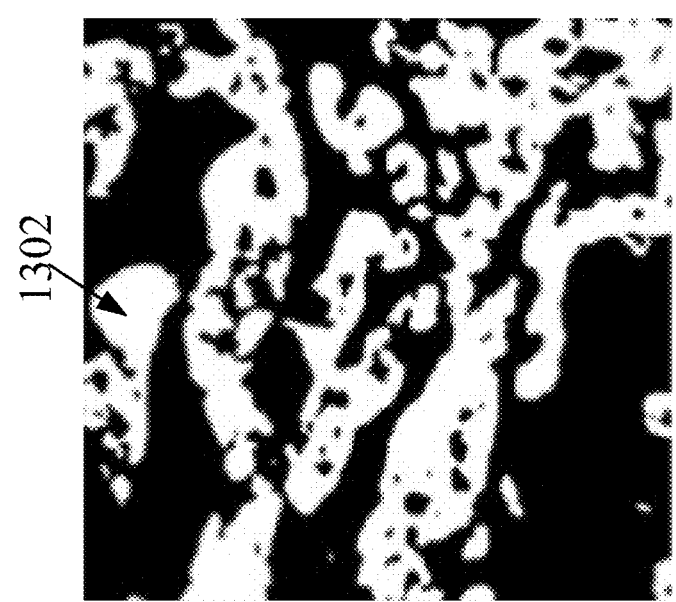
FIG. 13C is an epithelial cell region binary image according to an embodiment of this application.

In addition, the 109 images are scored by 31 doctors for three experiments. In Experiment 1 and experiment 2, the doctors directly perform IC scoring on the patches without assistance of AI. In Experiment 3, the doctors obtain IC results estimated based on AI, and meanwhile, IC region image results identified in FIG. 13B and FIG. 14B are also provided to the doctors as a reference. Experiments have found that, for the results based on the AI assistance, average accuracy of the 31 doctors is increased by 13.6% (which is increased from 0.679 (Experiment 1) and 0.71 (Experiment 2) to 0.815 (Experiment 3)). In the result of Experiment 3, accuracy of doctor+AI is higher than accuracy of AI. In the accuracy in the two intervals, the accuracy of the doctor is also increased by 3.9% (which is increased from 0.92 in Experiment 2 to 0.959 in Experiment 3).

For consistency analysis, scoring consistency between the 31 doctors is also improved. A scoring difference between the 31 doctors for a same patch image is verified by using a Fleiss' kappa statistic (FKS) method. Scoring is performed based on the four intervals, and consistency results are shown in Table 2. The consistency between the 31 doctors under the assistance of AI reaches 0.78.

TABLE 2

Accuracy of AI Auxiliary Model

| Consistency results in four intervals | Experiment 1 | Experiment 2 | Experiment 3 |
|---|---|---|---|
| Fleiss' kappa statistic | 0.43 | 0.47 | 0.78 |

Figure 15:
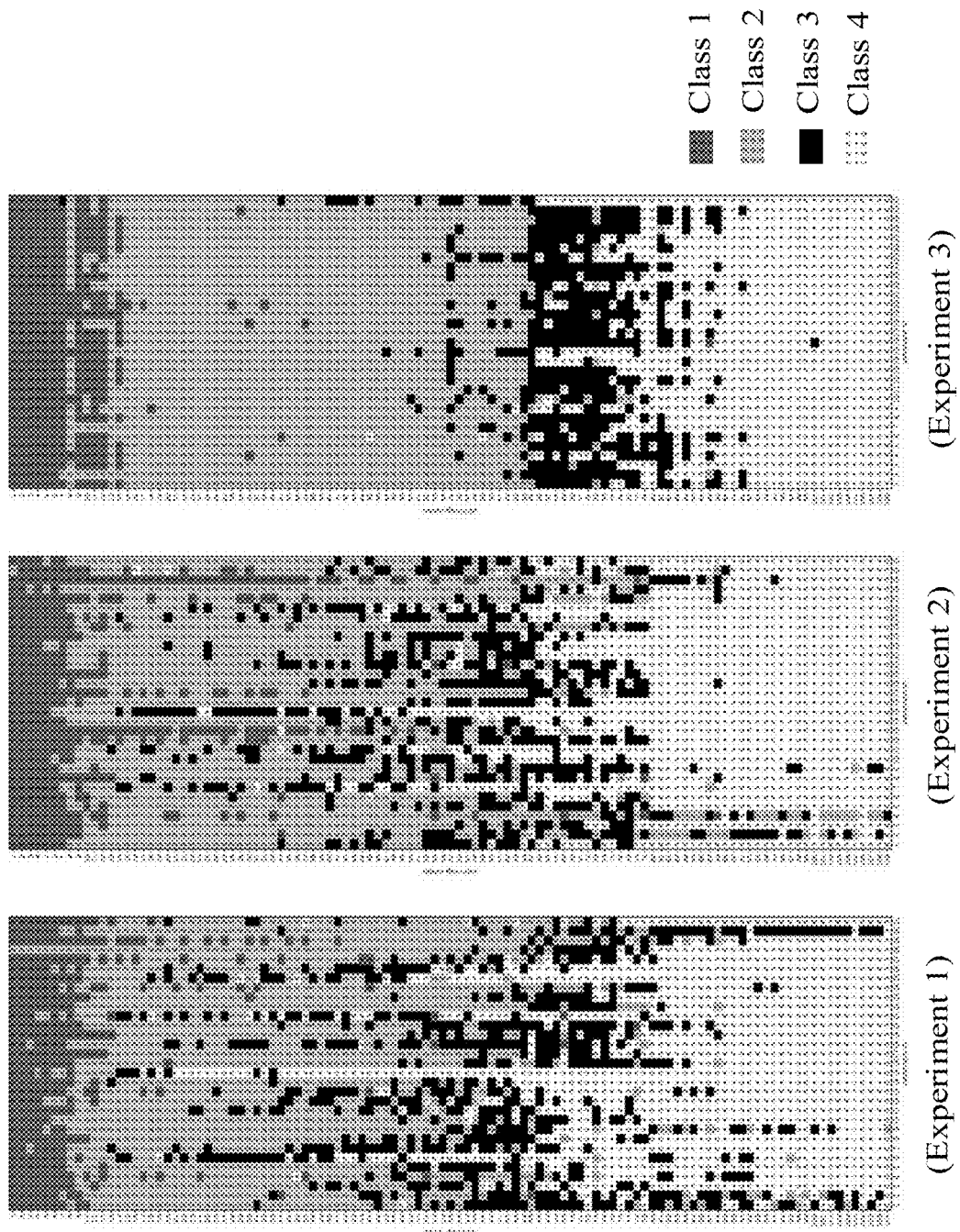
FIG. 15 is a schematic diagram of a consistency experiment according to an embodiment of this application.

Scoring results in the four intervals are shown in FIG. 15. A horizontal coordinate is a doctor identifier (ID), and a longitudinal coordinate is an image ID. Each color block in Experiment 1, Experiment 2, and Experiment 3 represents a score of a doctor for one image, that is, four scoring results of class 1, class 2, class 3, and class 4. Visually, the consistency between the scoring results in Experiment 3 is obviously superior to that in Experiment 1 and Experiment 2.

The artificial intelligence-based pathological image processing method provided in the embodiments of this application is described with reference to an exemplary application and implementation of the server provided in the embodiments of the application. An embodiment of this application further provides a pathological image processing apparatus. During actual application, functional modules in the pathological image processing apparatus may be cooperatively implemented by hardware resources of an electronic device (for example, a terminal device, a server, or a server cluster), for example, a calculation resource such as a processor, a communication resource (for example, being used for supporting implementation of various types of communication such as optical cable communication and cellular communication), and a memory. FIG. 3 shows a pathological image processing apparatus 555 stored in the memory 550. The pathological image processing apparatus may be software in a form of a program, a plug-in, or the like, for example, a software module designed by a programming language such as C/C++ or Java, application software or a dedicated software module in a large-scale software system designed by a programming language such as C/C++ or Java, an application interface, a plug-in, and a cloud service. Different implementations are described by using examples.

The pathological image processing apparatus 555 includes a series of modules such as a processing module 5551, a segmentation module 5552, a fusion module 5553, and a determining module 5554. The following continuously describes a solution for implementing the pathological image processing by cooperation of each module in the pathological image processing apparatus 555 provided by this embodiment of this application.

The processing module 5551 is configured to determine a seed pixel corresponding to an immune cell region from a pathological image; and obtain a seed pixel mask image corresponding to the seed pixel of the immune cell region from the pathological image based on the seed pixel of the immune cell region. The segmentation module 5552 is configured to segment an epithelial cell region in the pathological image, to obtain an epithelial cell mask image of the pathological image. The fusion module 5553 is configured to fuse the seed pixel mask image and the epithelial cell mask image of the pathological image, to obtain an effective seed pixel mask image corresponding to the immune cell region in the pathological image. The determining module 5554 is configured to determine a ratio value of the immune cell region in the pathological image based on the effective seed pixel mask image.

In some embodiments, the processing module 5551 is further configured to convert the pathological image from a first color space to a second color space, to obtain a pixel value of each pixel in the pathological image in the second color space; and determine, when the pixel value of the pixel in the second color space falls within a value range of the seed pixel, the pixel as the seed pixel of the immune cell region in the pathological image.

In some embodiments, a segmentation network configured to segment an epithelial cell includes an encoder and a decoder. The segmentation module 5552 is further configured to perform feature space-based encoding on the pathological image by using the encoder, to obtain a hidden space feature of the epithelial cell region in the pathological image; and perform mask space-based decoding on the hidden space feature by using the decoder, to obtain the epithelial cell mask image of the pathological image.

In some embodiments, the decoder includes a plurality of cascaded decoding layers. The segmentation module 5552 is further configured to perform upsampling decoding on the hidden space feature by using a first decoding layer in the plurality of cascaded decoding layers; output a decoding result of the first decoding layer to subsequent cascaded decoding layers, and continue to perform upsampling decoding by using the subsequent cascaded decoding layers and output decoding results until a decoding result is outputted to the last decoding layer; and map a decoding result outputted by the last decoding layer to a mask space, and use an obtained mapping result as the epithelial cell mask image of the pathological image.

In some embodiments, the segmentation module 5552 is further configured to perform the following processing operations for an $i^{th}$ decoding layer in the plurality of cascaded decoding layers: performing upsampling processing on a decoding result outputted by an $(i-1)^{th}$ decoding layer, to obtain an upsampling result of the $i^{th}$ decoding layer; performing convolution processing on the upsampling result of the $i^{th}$ decoding layer, to obtain a decoding result of the $i^{th}$ decoding layer; and outputting the decoding result of the $i^{th}$ decoding layer to an $(i+1)^{th}$ decoding layer, i being an increasing natural number and $2 \leq i < N$, and N being a total quantity of the plurality of cascaded decoding layers.

In some embodiments, the segmentation module 5552 is further configured to perform convolution processing on the decoding result outputted by the $(i-1)$th decoding layer, to obtain a first convolution result of the $i^{th}$ decoding layer; and perform full convolution processing on the first convolution result of the $i^{th}$ decoding layer, to obtain the upsampling result of the $i^{th}$ decoding layer.

In some embodiments, the encoder includes a plurality of cascaded encoding layers. The segmentation module 5552 is further configured to perform downsampling encoding on the pathological image by using a first encoding layer in the plurality of cascaded encoding layers; output an encoding result of the first encoding layer to subsequent cascaded encoding layers, and continue to perform downsampling encoding by using the subsequent cascaded encoding layers and output encoding results until an encoding result is outputted to the last encoding layer; and use an encoding result outputted by the last encoding layer as the hidden space feature of the epithelial cell region in the pathological image.

In some embodiments, when the decoder includes a plurality of cascaded decoding layers and a cross-layer connection exists between the decoding layer and the encoding layer that are in a same layer, the segmentation module 5552 is further configured to perform, by using a first decoding layer in the plurality of cascaded decoding layers, upsampling decoding on the hidden space feature outputted by an encoding layer that is in a cross-layer connection with the first decoding layer, and output a decoding result of the first decoding layer to a second decoding layer; splice, by using the second decoding layer, the decoding result of the first decoding layer and an encoding result outputted by an encoding layer that is in a cross-layer connection with the second decoding layer, to obtain a splicing result of the second decoding layer; perform upsampling decoding on the splicing result of the second decoding layer by using the second decoding layer; output a decoding result of the second decoding layer to subsequent cascaded decoding layers, and continue to perform splicing and upsampling decoding by using the subsequent cascaded decoding layers and output decoding results until a decoding result is outputted to the last decoding layer; and map a decoding result outputted by the last decoding layer to a mask space, and use an obtained mapping result as the epithelial cell mask image of the pathological image.

In some embodiments, the segmentation module 5552 is further configured to perform the following processing operations for a $j^{th}$ encoding layer in the plurality of cascaded encoding layers: performing encoding on an encoding result outputted by a $(j-1)^{th}$ encoding layer, to obtain a first encoding result of the $j^{th}$ encoding layer; combining the first encoding result of the $j^{th}$ encoding layer and the encoding result outputted by the $(j-1)^{th}$ encoding layer, to obtain a combination result of the $j^{th}$ encoding layer; performing encoding on the combination result of the $j^{th}$ encoding layer, to obtain a second encoding result of the $j^{th}$ encoding layer; combining the second encoding result of the $j^{th}$ encoding layer and the combination result of the $j^{th}$ encoding layer, to obtain an encoding result of the $j^{th}$ encoding layer; and outputting the encoding result of the $j^{th}$ encoding layer to a $(j+1)^{th}$ encoding layer, j being an increasing natural number and $2 \leq j < N$, and N being a total quantity of the plurality of cascaded encoding layers.

In some embodiments, the segmentation module 5552 is further configured to perform downsampling processing on the encoding result outputted by the $(j-1)^{th}$ encoding layer, to obtain a downsampling result of the $j^{th}$ encoding layer; and perform convolution processing on the downsampling result of the $j^{th}$ encoding layer, to obtain the first encoding result of the $j^{th}$ encoding layer.

In some embodiments, the fusion module 5553 is further configured to perform the following processing operations for each pixel in the epithelial cell mask image of the pathological image: performing negation processing on a pixel value of the pixel in the epithelial cell region, to obtain a negation value of the pixel; performing an AND logical operation on a pixel value of a pixel corresponding to the pixel in the seed pixel mask image and the negation value of the pixel, and using a result of the AND logical operation as an effective seed pixel of the immune cell region in the pathological image; and obtaining the effective seed pixel mask image corresponding to the immune cell region from the pathological image based on a plurality of effective seed pixels of the immune cell region in the pathological image.

In some embodiments, the fusion module 5553 is further configured to determine a seed pixel region in the seed pixel mask image; determine the epithelial cell region in the epithelial cell mask image of the pathological image; and remove the epithelial cell region from the seed pixel region, to obtain the effective seed pixel mask image corresponding to the immune cell region in the pathological image.

In some embodiments, the fusion module 5553 is further configured to perform the following processing operations for each pixel in the seed pixel region: performing negation processing on a pixel value of a pixel corresponding to the pixel in the epithelial cell region, to obtain a negation value of the pixel; performing an AND logical operation on a pixel value of the pixel in the seed pixel region and the negation value of the pixel, and using a result of the AND logical operation as an effective seed pixel of the immune cell region in the pathological image; and obtaining the effective seed pixel mask image corresponding to the immune cell region from the pathological image based on effective seed pixels of immune cell regions in a plurality of pathological images.

In some embodiments, the determining module 5554 is further configured to perform morphological processing on the effective seed pixel mask image, to obtain a morphological effective seed pixel mask image; determine a first quantity of effective seed pixels in the morphological effective seed pixel mask image; determine a second quantity of all pixels in the morphological effective seed pixel mask image; and use a ratio of the quantity of effective seed pixels to the quantity of all pixels as the ratio value of the immune cell region in the pathological image.

An embodiment of this application provides a computer program product or a computer program. The computer program product or the computer program includes computer instructions, and the computer instructions are stored in a non-transitory computer-readable storage medium. The processor of the computer device reads the computer instructions from the computer-readable storage medium, and the processor executes the computer instructions, to cause the computer device to perform the artificial intelligence-based pathological image processing method according to the embodiments of this application.

An embodiment of this application provides a computer-readable storage medium storing executable instructions, the executable instructions, when executed by a processor, causing the processor to perform the artificial intelligence-based pathological image processing method, for example, the artificial intelligence-based pathological image processing method shown in FIG. 4A to FIG. 4C, provided in the embodiments of this application.

In some embodiments, the computer-readable storage medium may be a memory such as a ferroelectric RAM (FRAM), a ROM, a programmable ROM (PROM), an electrically programmable ROM (EPROM), an electrically erasable PROM (EEPROM), a flash memory, a magnetic surface memory, an optical disk, or a CD-ROM, or may be any device including one of or any combination of the foregoing memories.

In some embodiments, the executable instructions can be written in a form of a program, software, a software module, a script, or code and according to a programming language (including a compiler or interpreter language or a declarative or procedural language) in any form, and may be deployed in any form, including an independent program or a module, a component, a subroutine, or another unit suitable for use in a computing environment.

In an example, the executable instructions may, but do not necessarily, correspond to a file in a file system, and may be stored in a part of a file that saves another program or other data, for example, be stored in one or more scripts in a hypertext markup language (HTML) file, stored in a file that is specially used for a program in discussion, or stored in the plurality of collaborative files (for example, be stored in files of one or modules, subprograms, or code parts).

In an example, the executable instructions can be deployed for execution on one computing device, execution on a plurality of computing devices located at one location, or execution on a plurality of computing devices that are distributed at a plurality of locations and that are interconnected through a communication network. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A pathological image processing method performed by an electronic device, comprising:
   determining seed pixels of an immune cell region from a pathological image;
   obtaining a seed pixel mask image corresponding to the seed pixels of the immune cell region from the pathological image based on the seed pixels of the immune cell region;
   segmenting an epithelial cell region in the pathological image, to obtain an epithelial cell mask image of the pathological image;
   fusing the seed pixel mask image and the epithelial cell mask image of the pathological image, to obtain an effective seed pixel mask image corresponding to the immune cell region in the pathological image;
   performing morphological processing on the effective seed pixel mask image, to obtain a morphological effective seed pixel mask image; and
   determining a ratio value of the immune cell region in the pathological image based on the morphological effective seed pixel mask image.

2. The method according to claim 1, wherein the determining a seed pixel of an immune cell region from a pathological image comprises:
   converting the pathological image from a first color space to a second color space, to obtain a pixel value of each pixel of the pathological image in the second color space; and determining, when the pixel value of the pixel in the second color space falls within a value range of the seed pixel, the pixel as the seed pixel of the immune cell region in the pathological image.

3. The method according to claim 1, wherein a segmentation network configured to segment an epithelial cell comprises an encoder and a decoder; and the segmenting an epithelial cell region in the pathological image, to obtain an epithelial cell mask image of the pathological image comprises:

performing feature space-based encoding on the pathological image by using the encoder, to obtain a hidden space feature of the epithelial cell region in the pathological image; and performing mask space-based decoding on the hidden space feature by using the decoder, to obtain the epithelial cell mask image of the pathological image.

4. The method according to claim 3, wherein the decoder comprises a plurality of cascaded decoding layers; and the performing mask space-based decoding on the hidden space feature by using the decoder, to obtain the epithelial cell mask image of the pathological image comprises:

performing upsampling decoding on the hidden space feature by using a first decoding layer in the plurality of cascaded decoding layers;

outputting a decoding result of the first decoding layer to subsequent cascaded decoding layers, and continuing to perform upsampling decoding by using the subsequent cascaded decoding layers and outputting decoding results until a decoding result is outputted to the last decoding layer; and mapping a decoding result outputted by the last decoding layer to a mask space, and using an obtained mapping result as the epithelial cell mask image of the pathological image.

5. The method according to claim 3, wherein the encoder comprises a plurality of cascaded encoding layers; and the performing feature space-based encoding on the pathological image by using the encoder, to obtain a hidden space feature of the epithelial cell region in the pathological image comprises:

performing downsampling encoding on the pathological image by using a first encoding layer in the plurality of cascaded encoding layers;

outputting an encoding result of the first encoding layer to subsequent cascaded encoding layers, and continuing to perform downsampling encoding by using the subsequent cascaded encoding layers and outputting encoding results until an encoding result is outputted to the last encoding layer; and using an encoding result outputted by the last encoding layer as the hidden space feature of the epithelial cell region in the pathological image.

6. The method according to claim 1, wherein the fusing the seed pixel mask image and the epithelial cell mask image of the pathological image, to obtain an effective seed pixel mask image corresponding to the immune cell region in the pathological image comprises:

performing the following processing operations for each pixel in the epithelial cell mask image of the pathological image:

performing negation processing on a pixel value of the pixel, to obtain a negation value of the pixel;

performing an AND logical operation on a pixel value of a pixel corresponding to the pixel in the seed pixel mask image and the negation value of the pixel, and using a result of the AND logical operation as an effective seed pixel of the immune cell region in the pathological image; and obtaining the effective seed pixel mask image corresponding to the immune cell region from the pathological image based on a plurality of effective seed pixels of the immune cell region in the pathological image.

7. The method according to claim 1, wherein the fusing the seed pixel mask image and the epithelial cell mask image of the pathological image, to obtain an effective seed pixel mask image corresponding to the immune cell region in the pathological image comprises:

determining a seed pixel region in the seed pixel mask image;

determining the epithelial cell region in the epithelial cell mask image of the pathological image; and removing the epithelial cell region from the seed pixel region, to obtain the effective seed pixel mask image corresponding to the immune cell region in the pathological image.

8. The method according to claim 1, wherein the determining a ratio value of the immune cell region in the pathological image based on the morphological effective seed pixel mask image comprises:

determining a first quantity of effective seed pixels in the morphological effective seed pixel mask image;

determining a second quantity of all pixels in the morphological effective seed pixel mask image; and using a ratio of the first quantity to the second quantity as the ratio value of the immune cell region in the pathological image.

9. An electronic device, comprising:

a memory, configured to store executable instructions; and a processor, configured to implement a pathological image processing method by executing the executable instructions stored in the memory, the method including:

determining seed pixels of an immune cell region from a pathological image;

obtaining a seed pixel mask image corresponding to the seed pixels of the immune cell region from the pathological image based on the seed pixels of the immune cell region;

segmenting an epithelial cell region in the pathological image, to obtain an epithelial cell mask image of the pathological image;

fusing the seed pixel mask image and the epithelial cell mask image of the pathological image, to obtain an effective seed pixel mask image corresponding to the immune cell region in the pathological image;

performing morphological processing on the effective seed pixel mask image, to obtain a morphological effective seed pixel mask image; and determining a ratio value of the immune cell region in the pathological image based on the morphological effective seed pixel mask image.

10. The electronic device according to claim 9, wherein the determining a seed pixel of an immune cell region from a pathological image comprises:

converting the pathological image from a first color space to a second color space, to obtain a pixel value of each pixel of the pathological image in the second color space; and determining, when the pixel value of the pixel in the second color space falls within a value range of the seed pixel, the pixel as the seed pixel of the immune cell region in the pathological image.

11. The electronic device according to claim 9, wherein a segmentation network configured to segment an epithelial cell comprises an encoder and a decoder; and
the segmenting an epithelial cell region in the pathological image, to obtain an epithelial cell mask image of the pathological image comprises:
performing feature space-based encoding on the pathological image by using the encoder, to obtain a hidden space feature of the epithelial cell region in the pathological image; and
performing mask space-based decoding on the hidden space feature by using the decoder, to obtain the epithelial cell mask image of the pathological image.

12. The electronic device according to claim 11, wherein the decoder comprises a plurality of cascaded decoding layers; and
the performing mask space-based decoding on the hidden space feature by using the decoder, to obtain the epithelial cell mask image of the pathological image comprises:
performing upsampling decoding on the hidden space feature by using a first decoding layer in the plurality of cascaded decoding layers;
outputting a decoding result of the first decoding layer to subsequent cascaded decoding layers, and continuing to perform upsampling decoding by using the subsequent cascaded decoding layers and outputting decoding results until a decoding result is outputted to the last decoding layer; and
mapping a decoding result outputted by the last decoding layer to a mask space, and using an obtained mapping result as the epithelial cell mask image of the pathological image.

13. The electronic device according to claim 11, wherein the encoder comprises a plurality of cascaded encoding layers; and
the performing feature space-based encoding on the pathological image by using the encoder, to obtain a hidden space feature of the epithelial cell region in the pathological image comprises:
performing downsampling encoding on the pathological image by using a first encoding layer in the plurality of cascaded encoding layers;
outputting an encoding result of the first encoding layer to subsequent cascaded encoding layers, and continuing to perform downsampling encoding by using the subsequent cascaded encoding layers and outputting encoding results until an encoding result is outputted to the last encoding layer; and
using an encoding result outputted by the last encoding layer as the hidden space feature of the epithelial cell region in the pathological image.

14. The electronic device according to claim 9, wherein the fusing the seed pixel mask image and the epithelial cell mask image of the pathological image, to obtain an effective seed pixel mask image corresponding to the immune cell region in the pathological image comprises:
performing the following processing operations for each pixel in the epithelial cell mask image of the pathological image:
performing negation processing on a pixel value of the pixel, to obtain a negation value of the pixel;
performing an AND logical operation on a pixel value of a pixel corresponding to the pixel in the seed pixel mask image and the negation value of the pixel, and using a result of the AND logical operation as an effective seed pixel of the immune cell region in the pathological image; and
obtaining the effective seed pixel mask image corresponding to the immune cell region from the pathological image based on a plurality of effective seed pixels of the immune cell region in the pathological image.

15. The electronic device according to claim 9, wherein the fusing the seed pixel mask image and the epithelial cell mask image of the pathological image, to obtain an effective seed pixel mask image corresponding to the immune cell region in the pathological image comprises:
determining a seed pixel region in the seed pixel mask image;
determining the epithelial cell region in the epithelial cell mask image of the pathological image; and
removing the epithelial cell region from the seed pixel region, to obtain the effective seed pixel mask image corresponding to the immune cell region in the pathological image.

16. The electronic device according to claim 9, wherein the determining a ratio value of the immune cell region in the pathological image based on the morphological effective seed pixel mask image comprises:
determining a first quantity of effective seed pixels in the morphological effective seed pixel mask image;
determining a second quantity of all pixels in the morphological effective seed pixel mask image; and
using a ratio of the first quantity to the second quantity as the ratio value of the immune cell region in the pathological image.

17. A non-transitory computer-readable storage medium, storing executable instructions, the executable instructions, when executed by a processor of an electronic device, causing the electronic device to implement a pathological image processing method including:
determining seed pixels of an immune cell region from a pathological image;
obtaining a seed pixel mask image corresponding to the seed pixels of the immune cell region from the pathological image based on the seed pixels of the immune cell region;
segmenting an epithelial cell region in the pathological image, to obtain an epithelial cell mask image of the pathological image;
fusing the seed pixel mask image and the epithelial cell mask image of the pathological image, to obtain an effective seed pixel mask image corresponding to the immune cell region in the pathological image;
performing morphological processing on the effective seed pixel mask image, to obtain a morphological effective seed pixel mask image; and
determining a ratio value of the immune cell region in the pathological image based on the morphological effective seed pixel mask image.

18. The non-transitory computer-readable storage medium according to claim 17, wherein the determining a seed pixel of an immune cell region from a pathological image comprises:
converting the pathological image from a first color space to a second color space, to obtain a pixel value of each pixel of the pathological image in the second color space; and determining, when the pixel value of the pixel in the second color space falls within a value range of the seed pixel, the pixel as the seed pixel of the immune cell region in the pathological image.

19. The non-transitory computer-readable storage medium according to claim 17, wherein
a segmentation network configured to segment an epithelial cell comprises an encoder and a decoder; and
the segmenting an epithelial cell region in the pathological image, to obtain an epithelial cell mask image of the pathological image comprises:
performing feature space-based encoding on the pathological image by using the encoder, to obtain a hidden space feature of the epithelial cell region in the pathological image; and
performing mask space-based decoding on the hidden space feature by using the decoder, to obtain the epithelial cell mask image of the pathological image.

20. The non-transitory computer-readable storage medium according to claim 17, wherein the fusing the seed pixel mask image and the epithelial cell mask image of the pathological image, to obtain an effective seed pixel mask image corresponding to the immune cell region in the pathological image comprises:
performing the following processing operations for each pixel in the epithelial cell mask image of the pathological image:
performing negation processing on a pixel value of the pixel, to obtain a negation value of the pixel;
performing an AND logical operation on a pixel value of a pixel corresponding to the pixel in the seed pixel mask image and the negation value of the pixel, and using a result of the AND logical operation as an effective seed pixel of the immune cell region in the pathological image; and
obtaining the effective seed pixel mask image corresponding to the immune cell region from the pathological image based on a plurality of effective seed pixels of the immune cell region in the pathological image.

* * * * *